US007333439B2

(12) United States Patent
Itoh et al.

(10) Patent No.: US 7,333,439 B2
(45) Date of Patent: Feb. 19, 2008

(54) SENDING/RECEIVING METHOD, AND DEVICE FOR THE SAME

(75) Inventors: Tomoaki Itoh, Osaka (JP); Takao Yamaguchi, Kyoto (JP); Junichi Sato, Nara (JP); Hiroshi Arakawa, Kyoto (JP); Yoshinori Matsui, Nara (JP); Yoji Notoya, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 981 days.

(21) Appl. No.: 10/168,367

(22) PCT Filed: Aug. 13, 2001

(86) PCT No.: PCT/JP01/06962

§ 371 (c)(1),
(2), (4) Date: Jun. 19, 2002

(87) PCT Pub. No.: WO02/17574

PCT Pub. Date: Feb. 28, 2002

(65) Prior Publication Data

US 2002/0191594 A1 Dec. 19, 2002

(30) Foreign Application Priority Data

Aug. 24, 2000 (JP) ............................. 2000-253718
Sep. 26, 2000 (JP) ............................. 2000-292066
Oct. 27, 2000 (JP) ............................. 2000-328592
Mar. 21, 2001 (JP) ............................. 2001-079942

(51) Int. Cl.
 *H04J 1/16* (2006.01)
 *H04L 12/28* (2006.01)

(52) U.S. Cl. ....................... 370/252; 370/401; 370/465

(58) Field of Classification Search ................ 370/235, 370/230, 352, 252, 465
See application file for complete search history.

(56) References Cited

U.S. PATENT DOCUMENTS 5,636,230 A * 6/1997 Marturano et al. ......... 714/748

(Continued)

FOREIGN PATENT DOCUMENTS

EP 795980 A2 9/1997

(Continued)

OTHER PUBLICATIONS

Kazutaka Yamamoto et al., "Kouiki Musen Tsuushin Media Riyouji no Gateway Kyouchou ni yoru TCP no Seinou Kaizen", Joho Shori Gakkai Kenkyu Houkoku, vol. 99, No. 4, pp. 191 to 196, Multimedia Tsuushin to Bunsan Shori 91-16, 99 DPS-91, Shadan Houjin Joho Shori Gakkai, Jan. 22, 1999, (CS-NG-2000-00910-013) full text.

(Continued)

*Primary Examiner*—Andrew C. Lee
(74) *Attorney, Agent, or Firm*—Harness, Dickey & Pierce P.L.C.

(57) ABSTRACT

The packet loss in a wired section is reported to a receiving terminal (61) using a loss notification packet from a gateway (62) located at the boundary between a wired section and a wireless section, and thus the causes for packet loss are separated. Also, using this loss notification packet, the packet loss rate in the wired section and the wireless section are separately calculated and the transmission rate and robustness of the data packets are determined with a sending terminal (60) in accordance with the respective loss rate of the sections.

12 Claims, 23 Drawing Sheets

U.S. PATENT DOCUMENTS

| | | | |
|---|---|---|---|
| 5,930,233 A * | 7/1999 | Kanerva et al. | 370/231 |
| 6,118,771 A | 9/2000 | Tajika et al. | |
| 6,208,620 B1 * | 3/2001 | Sen et al. | 370/231 |
| 6,408,184 B1 * | 6/2002 | Kallio et al. | 455/445 |
| 6,424,841 B1 * | 7/2002 | Gustafsson | 455/466 |
| 6,542,499 B1 * | 4/2003 | Murphy et al. | 370/352 |
| 6,643,496 B1 * | 11/2003 | Shimoyama et al. | 455/69 |
| 6,741,555 B1 * | 5/2004 | Li et al. | 370/229 |
| 6,757,245 B1 * | 6/2004 | Kuusinen et al. | 370/230 |
| 6,757,248 B1 * | 6/2004 | Li et al. | 370/235 |
| 6,760,860 B1 * | 7/2004 | Fong et al. | 714/4 |
| 6,766,309 B1 * | 7/2004 | Cheng et al. | 706/3 |
| 6,772,209 B1 * | 8/2004 | Chernock et al. | 709/225 |
| 6,912,216 B1 * | 6/2005 | Smith et al. | 370/352 |
| 6,954,797 B1 * | 10/2005 | Takeda et al. | 709/236 |
| 7,058,048 B2 * | 6/2006 | Clark | 370/356 |
| 7,092,410 B2 * | 8/2006 | Bordonaro et al. | 370/516 |
| 2002/0188748 A1 * | 12/2002 | Blackwell et al. | 709/232 |
| 2003/0035407 A1 * | 2/2003 | Govindarajan et al. | 370/349 |

FOREIGN PATENT DOCUMENTS

| | | | |
|---|---|---|---|
| EP | 1061699 A1 | 12/2000 | |
| JP | 9-261255 | 10/1997 | |
| JP | 9-298575 | 11/1997 | |
| JP | 11-243419 | 9/1999 | |
| JP | 11-252073 | 9/1999 | |
| JP | 2001-045098 | 2/2001 | |
| JP | 2001-079942 | 3/2001 | |
| JP | 2001-160824 | 6/2001 | |
| WO | WO-99/44340 A1 | 9/1999 | |

OTHER PUBLICATIONS

D. Sisalem et al., "The Direct Adjustment Algorithm: A TCP-Friendly Adaptation Scheme", Technical Report GMD-FOKUS, Aug. 1997. Available from http://www.fokus.gmd.dc/usr/sisalem.

D. Sisalem et al., "The Loss-Delay Based Adjustment Algorithm: A TCP-Friendly Adaptation Scheme", in the proceedings of NOSSDAV '98, July Cambridge UK.

J. Rosenberg et al., "An RPT Payload Format for Generic Forward Error Correction", RFC 2733, Internet Engineering Taskforce, Dec. 1999.

K. Yano et al., "RTP Profile for RTCP-based Retransmission Request for Unicast session", Internet Draft, draft-podolsky-avt-rtprx-01.txt, Internet Engineering Taskforce, Mar. 2000.

A. Miyazaki et al., "RTP Payload Format to Enable Multiple Selective Retransmissions", Internet Draft, draft-miyazaki-avt-rtp-selret-01.txt, Internet Engineering Taskforce, Jul. 2000.

International Search Report—PCT/JP01/06962, ISA/JPO, Nov. 6, 2001.

* cited by examiner

FIG. 8

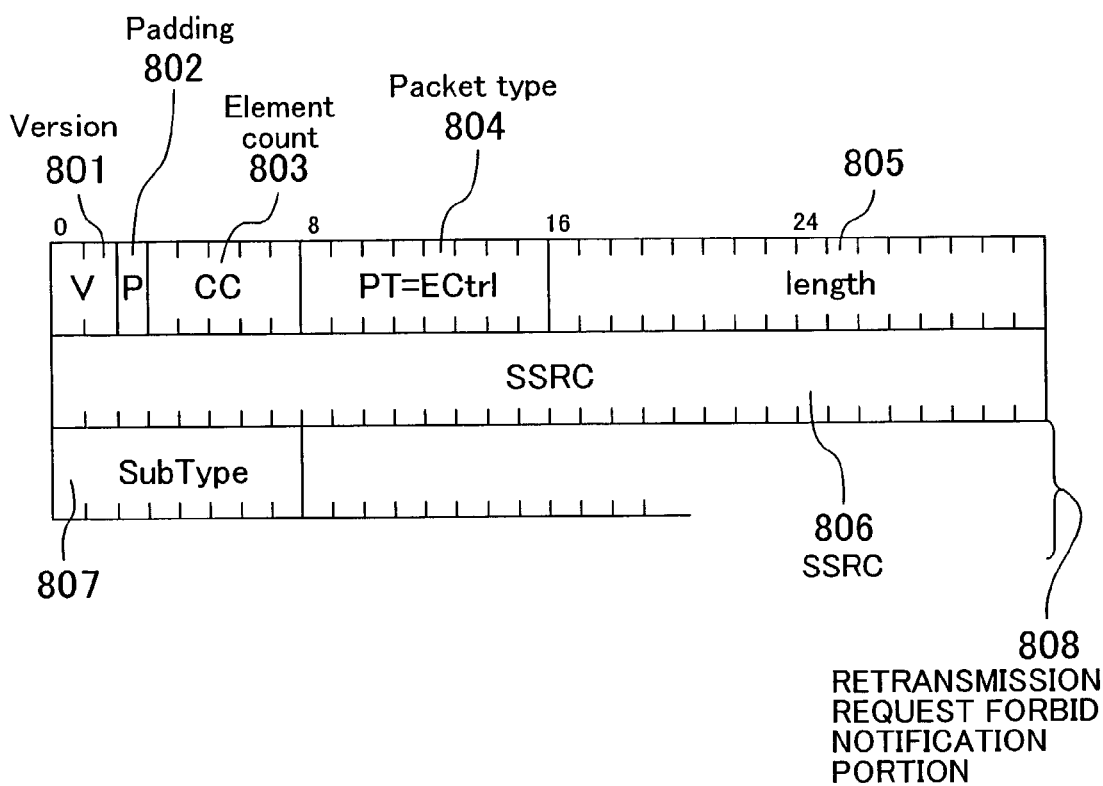

SubType: identifier representing any of the retransmission
request forbid notification, packet loss notification,
or retransmission request allow notification
SubType=0: retransmission request forbid notification
SubType=1: packet loss notification
SubType=2: retransmission request allow notification
*The subsequent format changes depending on the SubType

FIG. 9

In case of SubType=0 or 2

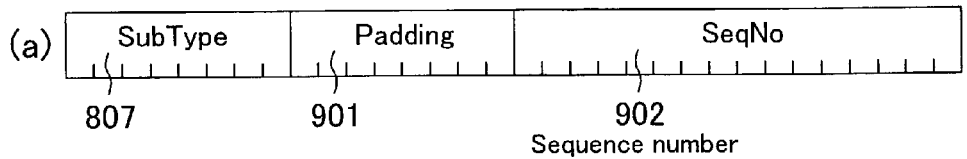

(a) SubType | Padding | SeqNo
807    901    902
Sequence number

In case of SubType=1 and FT≠111

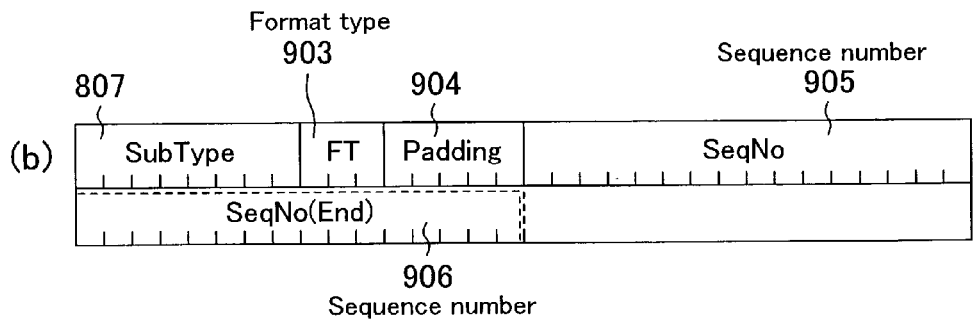

(b) SubType | FT | Padding | SeqNo
                 SeqNo(End)
807  903(Format type)  904  905(Sequence number)
906 Sequence number In case of SubType=1 and FT=111

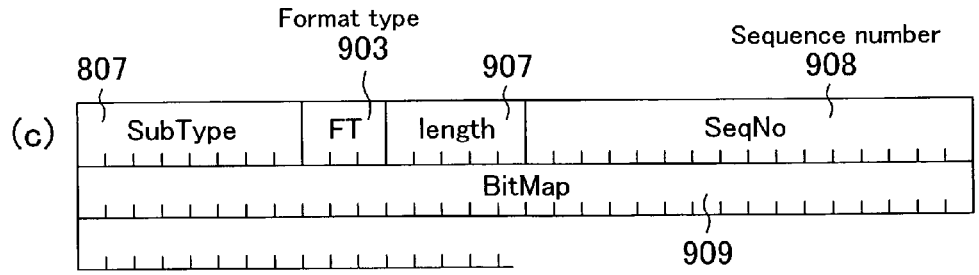

(c) SubType | FT | length | SeqNo
               BitMap
807  903(Format type)  907  908(Sequence number)
909

FT: designates format type of notification portion
    FT=000  single packet expressed by SeqNo
    FT=001  two packets sequential from packet expressed by SeqNo
    FT=010  three packets sequential from packet expressed by SeqNo
    FT=011  all packets from SeqNo to SeqNo (End)
    FT=111  packet expressed by SeqNo and BitMap
length: indicates up to which bit the last 32-bit word is valid
BitMap: represents the loss of the packet of sequence number
SeqNo_n+i when i-th bit is 1 (that is, forbid retransmission request)

FIG. 14

| Threshold L(i) | Robust Format T(i) |
|---|---|
| 0.05 | FEC = none<br>I frame insertion interval = every 30 frames<br>AIR = 5 macroblocks per frame<br>CIR = none<br>HEC = none<br>data packet size = 1000 bytes |
| 0.1 | FEC = insert 1 per 5 packets<br>I frame insertion interval = every 20 frames<br>AIR = 10 macroblocks per frame<br>CIR = none<br>HEC = none<br>data packet size = 500 bytes |
| 0.2 | FEC = insert 1 per 3 packets<br>I frame insertion interval = every 10 frames<br>AIR = 20 macroblocks per frame<br>CIR = 5 frame period<br>HEC = yes<br>data packet size = 250 bytes |

| wireless section \ wired section | 0.05 | 0.1 | 0.2 |
|---|---|---|---|
| 0.05 | address 00 | address 01 | address 02 |
| 0.1 | address 01 | address 11 | address 12 |
| 0.2 | address 20 | address 21 | address 22 |

| wireless section \ wired section | 0.05 | 0.1 | 0.2 |
|---|---|---|---|
| 0.05 | B,E1,E2 | B,E1 | B |
| 0.1 | B,E1,F1 | B,F1 | B |
| 0.2 | B,F1,F2 | B,F1 | B |

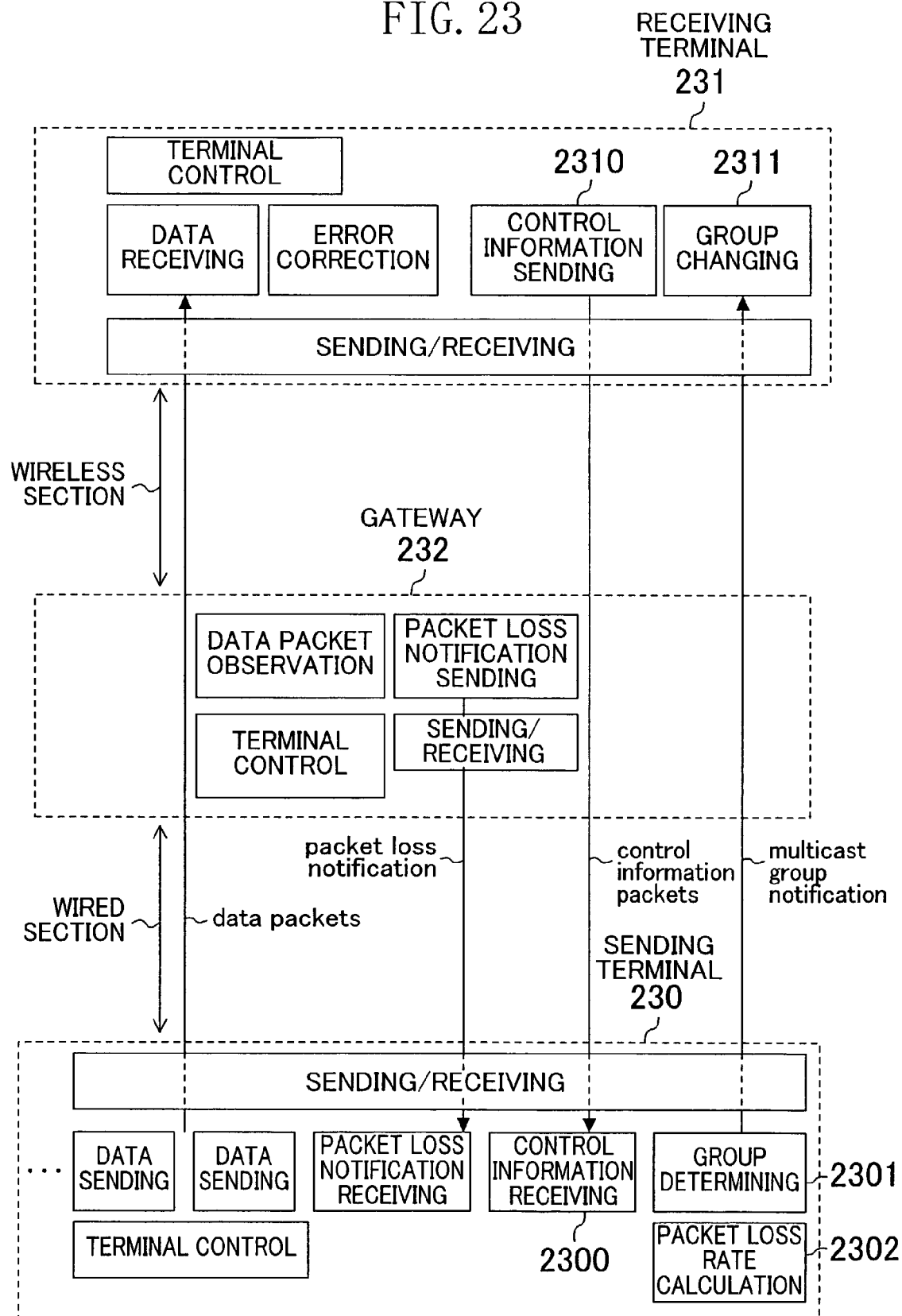

SENDING/RECEIVING METHOD, AND DEVICE FOR THE SAME

TECHNICAL FIELD

The present invention relates to a method for sending and receiving data in a network environment with innumerable receiving terminals of various specifications and capacities, such as portable telephones, portable information terminals, personal computers, and television receivers. In particular, the present invention relates to an information communications technology for efficiently transferring information when there is a mixture of information having large time series restrictions, such as audio information, and information which can be transferred even haltingly over time, such as still image data like artwork or medical images.

BACKGROUND ART

When packets are sent in an environment where packet loss occurs, retransmitting the lost packets enables data transmission of a high service quality. Methods providing the framework for retransmission in RTP (Realtime Transport Protocol) include sending/receiving methods for stream packets, such as W-RTP (Wireless-RTP) and RTP/RX. In W-RTP and RTP/RX, a request for retransmission of lost packets is sent from the receiving terminal using the RTCP (RTP Control Protocol) and in response to that retransmission request, the sending terminal retransmits the RTP packets (see A. Miyazaki et al., "RTP Payload Format to Enable Multiple Selective Retransmissions", Internet Draft, draft-miyazaki-avt-rtp-selret-01.txt, Internet Engineering Taskforce, July 2000, and K. Yano et al., "RTP Profile for RTCP-based Retransmission request for Unicast session", Internet Draft, draft-podolsky-avt-rtprx-01.txt, Internet Engineering Taskforce, March 2000).

On the other hand, RFC2733 defines a technology for recovering lost packets by FEC (Forward Error Correction) (J. Rosenberg et al., "An RTP Payload Format for Generic Forward Error Correction", RFC2733, Internet Engineering Taskforce, December 1999). With the technology disclosed in JP 2001-045098A, to enable the selection of the reception rate and robustness suited for the respective reception environments of the receiving terminals in a multicast environment, hierarchical encoding of the data is adopted on the sending side and if necessary the receiving terminals use FEC data. The receiving terminals monitor send/receive conditions such as the packet loss rate, the transmission rate, and the reception rate, and calculate the ratio of the reception rate to the transmission rate, that is, the send/receive rate. Furthermore, they determine the hierarchy of the data to be received and whether the reception of FEC data is necessary in accordance with the packet loss rate and the send/receive rate.

The above conventional technologies have experienced various types of problems, including the following.

First Problem

Retransmission must be restricted (1) when the sending terminal or transmission path is overloaded; (2) when retransmission is restricted to secure a band for the sending of stream packets so as to send the stream packets to even more receiving terminals; and (3) when different services are provided by distinguishing whether or not to perform retransmission at each receiving terminal. W-RTP and RTP/RX do not have a function for interrupting the request for retransmission even in these cases, so receiving terminals continue sending retransmission request packets, which wastes bandwidth.

Second Problem

With W-RTP and RTP/RX, if the sending terminal receives numerous retransmission request packets from a plurality of receiving terminals at once, then the sending terminal or the transmission path may become momentarily overloaded, which can negatively affect the sending of data packets by the sending device.

Third Problem

Let us assume that a transmission path for packets has a wired section and a wireless section. Generally speaking, the cause of loss in wired sections and wireless sections is different. Packet loss in wired sections is caused by congestion, and thus there is the possibility that the congestion is further exacerbated by the requests for retransmission. Consequently, when there is packet loss in wired sections, it is necessary that the transmission rate of the packets is lowered or a process for not executing the retransmission request is performed when making a retransmission request. The cause of packet loss in wireless sections is the disposal of packets by the receiving terminal due to bit errors. Therefore, the packet loss rate does not change even if the method for retransmission on wired sections is used and the transmission rate of the packets is lowered in accordance with the retransmission request, and the result is a continual decrease in the packet transmission rate. Accordingly, when making a retransmission request, the receiving terminals must distinguish and separate the section experiencing the loss and switch the method for requesting retransmission depending on whether the loss is in a wired section or whether the loss is in a wireless section.

However, RTP/RX does not include a method for distinguishing between packet loss in wired sections and packet loss in wireless sections. W-RTP is capable of changing the SSN (Second Sequence Number) of the W-RTP packets in the gateway at the boundary between wired sections and wireless sections so as to not make a request for retransmission regarding packets lost in wired sections. However, W-RTP is a method in which the packet format of the RTP is changed, and therefore to receive streams from a sending terminal sending conventional RTP packets, the sending terminal must be changed to send W-RTP packets or there must be a conversion process for converting RTP headers into headers for W-RTP at the gateway.

Fourth Problem

The operation must be switched because of packet loss not only in the case of retransmission but also when controlling the transmission rate and adding robustness to the data packets. In case of packet loss caused by congestion, the transmission rate must be lowered to avoid congestion, but when packet loss results from transmission errors, the error rate cannot be changed by lowering the transmission rate, so rather that lowering the transmission rate is meaningless, and instead the robustness added to the data packets should be made stronger.

With the technology of JP 2001-045098A, the packet length even of packets experiencing transmission errors must be known for the receiving terminal to monitor the reception rate. Yet there is the possibility that errors may occur in the field indicating the packet length, and therefore the accurate reception rate cannot be determined. Furthermore, it is not possible to determine from the send/receive rate ratio how much packet loss actually occurred in the wireless sections, so it is difficult to determine how much robustness to add (that is, determine the threshold value of the send/receive rate ratio).

DISCLOSURE OF THE INVENTION

In light of these conventional problems, it is an object of the present invention to perform data transmission with a stable transmission quality in a transmission path like the Internet in which there are various connection schemes and fluctuations in the transmission bandwidth (and in particular in a connection scheme with mixed wired and wireless networks, where it has conventionally been difficult to carry out data transmission with a stable transmission quality).

To achieve this object, a first sending/receiving method according to the present invention is a sending/receiving method for sending and receiving data packets between a sending terminal and a receiving terminal via a gateway in a transmission path having a wired section and a wireless section, wherein the gateway is at a boundary portion between those sections, wherein the method includes calculating the packet loss rate in the wired section and the packet loss rate in the wireless section based on the packet loss detected at the gateway and the packet loss detected by the receiving terminal, and determining at least one of a transmission rate or a robustness of the data packets based on both of the packet loss rates.

Furthermore, a second sending/receiving method according to the present invention is a sending/receiving method in which based on at least one of the state of the load on a sending terminal or a transmission path, the level of service provided to a receiving terminal, the classification of the application, and the classification of data to be transmitted, a retransmission request forbidding notification packet forbidding a request for retransmission is sent from the sending terminal to forbid a retransmission request from the receiving terminal, and a retransmission request allowing notification packet allowing a request for retransmission is sent from the sending terminal to allow a retransmission request from the receiving terminal.

Further, a third sending/receiving method according to the present invention is a sending/receiving method for sending identical data packets from a sending terminal to a plurality of receiving terminals, wherein a time for performing a retransmission request from the receiving terminal or whether to perform the retransmission request is randomized, and data packets for which there was a retransmission request are sent by the sending terminal even to receiving terminals not requesting retransmission of those data packets.

Furthermore, a fourth sending/receiving method according to the present invention is a sending/receiving method for sending and receiving data packets between a sending terminal and a receiving terminal via a gateway in a transmission path having a wired section and a wireless section, wherein the gateway is at a boundary portion between those sections, and performing with the receiving terminal a retransmission request for data packets lost between the gateway and the receiving terminal, wherein the gateway sends the receiving terminal information showing the loss of data packets between the sending terminal and the gateway as a loss notification packet, and a retransmission request is not performed by the receiving terminal for data packets reported by the loss notification packet.

BRIEF DESCRIPTION OF THE DRAWINGS

FIG. 8 is a diagram showing an example format for RTCP packets according to the first and third embodiments of the present invention.

FIGS. 9($a$) to 9($c$) are diagrams showing examples of the format for the portion below the SubType in FIG. 8.

FIG. 14 is a correlation chart of the threshold value of the packet loss rate and the robust format according to the fourth embodiment of the present invention.

FIG. 23 is a schematic diagram illustrating an overall view of the eighth embodiment of the present invention.

BEST MODE FOR CARRYING OUT THE INVENTION

The following is a description of embodiments according to the present invention, with reference to the drawings.

FIRST EMBODIMENT

The present embodiment is primarily for solving the above first problem by individually forbidding or allowing the retransmission requests of a plurality of receiving terminals for retransmission from the sending terminal.

Figure 1:
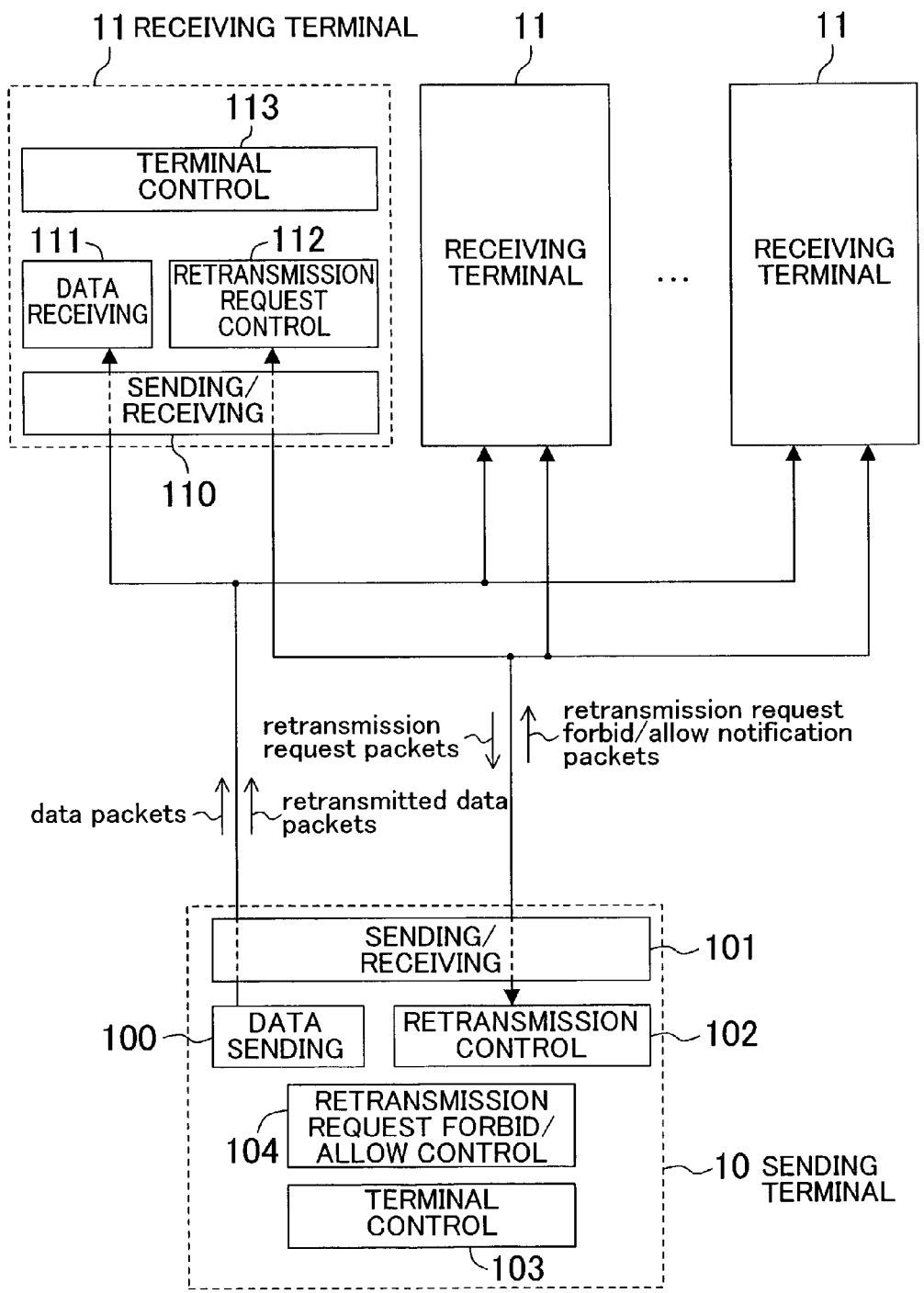
FIG. 1 is a schematic diagram illustrating an overall view of the first embodiment of the present invention.

FIG. 1 is a schematic diagram illustrating an overall view of the present embodiment. In a sending terminal 10, a sending/receiving portion 101 is a means for receiving and sending packets, such as a modem or a LAN (Local Area Network). The communications environment is presumed to be an environment with packet loss generated by noise and congestion.

A data sending portion 100 is a means for taking in data from input, such as a video capture, a microphone, a file, or a shared memory, encoding the data if necessary, packetizing the data if necessary, and sending data packets to a receiving terminal 11 via the sending/receiving portion 101. It is also a means for retransmitting, upon a command from a retransmission control portion 102, the data packets for which there have been retransmission requests.

The retransmission control portion 102 is a means for receiving retransmission request packets from the receiving terminal 11 and instructing the data sending portion 100 to retransmit the requested data packets. It is moreover a means for sending retransmission request forbidding notification packets and retransmission request allowing notification packets to the receiving terminal 11 upon a command from a retransmission request forbid/allow control portion 104.

The retransmission request forbid/allow control portion 104 is a means for observing the load on the transmission path and the sending terminal 10, the classification of connected users, and the classification of applications in use by the users, for example, and in response to this information, instructing the retransmission control portion 102 to send either a retransmission request forbidding notification packet or a retransmission request allowing notification packet to the receiving terminal 11. A conceivable example of forbidding or allowing a retransmission request based on user classification is a case wherein it depends on the services a user has joined whether retransmissions are made or not, and retransmissions are performed for users paying the more expensive service fees so as to provide them with the best quality service. A conceivable example of forbidding or allowing a retransmission request based on the classification of the application is that the retransmission request is allowed if the application has weak real-time properties, such as VoD (Video on Demand), and the retransmission request is forbidden if the application has strong real-time properties, such as TV telephone. This is because with applications having strong real-time properties the retransmission often arrives too late.

A terminal control portion 103 is a means for controlling these portions.

In the receiving terminal 11, a sending/receiving portion 110 is a means for receiving the data packets sent from the sending terminal 10, such as a modem or a LAN. A data receiving portion 111 is a means for taking data packets from the sending/receiving portion 110 and if necessary rearranging the packets in sequence number order, if necessary unpacking the packets, if necessary decoding the packets, and then transferring the data to an output such as a monitor, a speaker, a file, or a shared memory. A retransmission request control portion 112 observes the data packet loss and makes a retransmission request for the lost packets. It is also a means for performing control such that a retransmission request is not made in case a retransmission request forbidding notification packet has been received from the sending terminal 10. A terminal control portion 113 is a means for controlling these portions.

Information sent and received between the sending terminal 10 and the receiving terminal 11 are retransmission request packets, retransmission request forbid/allow notification packets, data packets, and retransmitted data packets. Retransmission request packets are sent from the retransmission request control portion 112 and received by the retransmission control portion 102. The retransmission request forbid/allow notification packets are sent from the retransmission control portion 102 and received by the retransmission request control portion 112. The data packets and the retransmitted data packets are sent from the data sending portion 100 and received by the data receiving portion 111. The sending terminal 10 sends and receives retransmission request packets, retransmission request forbid/allow notification packets, data packets, and retransmitted data packets to and from a plurality of receiving terminals 11.

Figure 2:
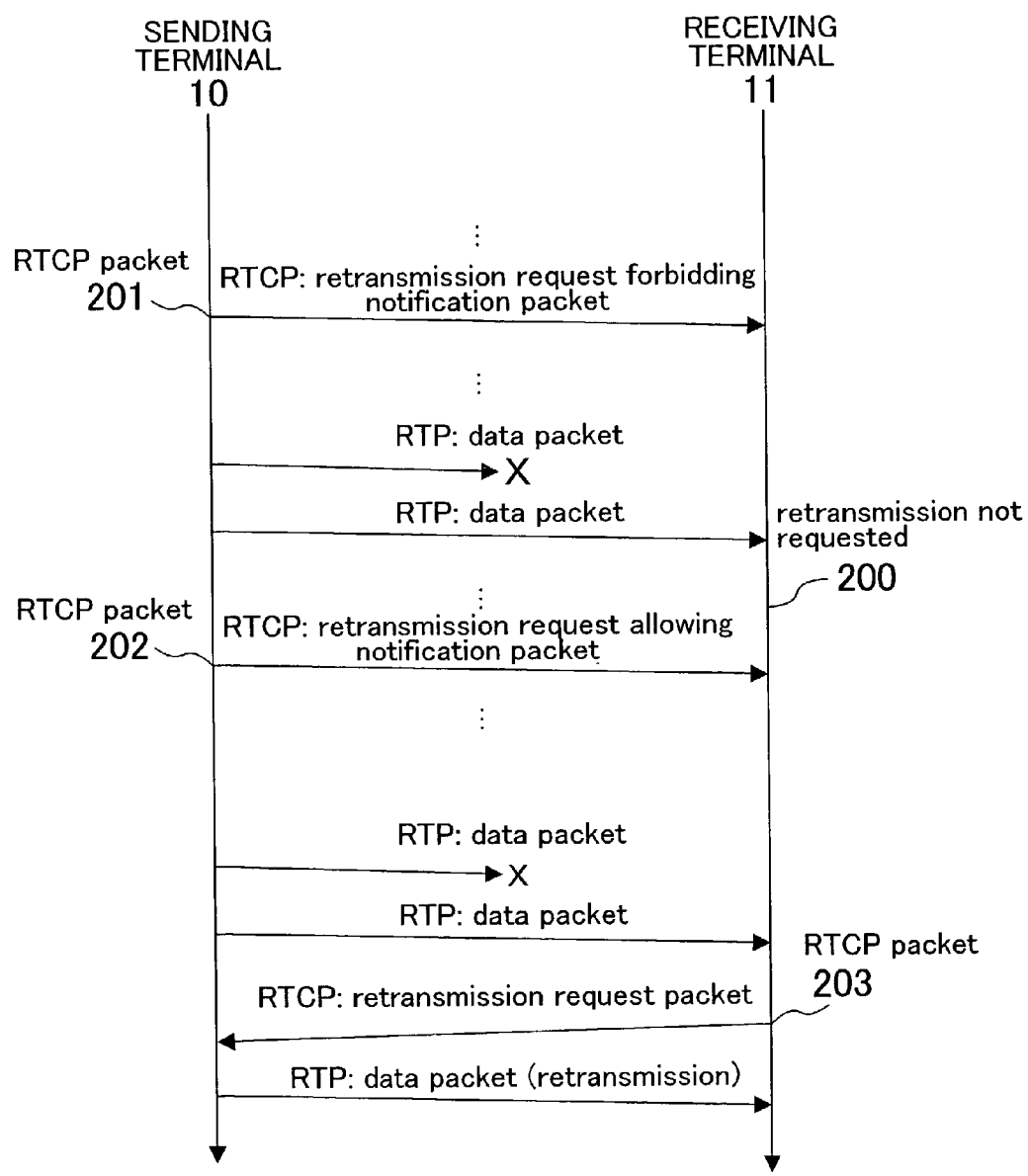
FIG. 2 is a sequence diagram between the sending terminal and the receiving terminal according to the first embodiment of the present invention.

FIG. 2 is a sequence diagram for the case that, between the sending terminal 10 and the receiving terminal 11, the RTCP is used for the sending and receiving of the retransmission request forbid/allow notification packets and retransmission request packets, and the RTP is used to send and receive data packets.

The sending terminal 10 notifies some or all of the receiving terminals 11 with retransmission request forbidding notification packets (RTCP packet 201) because (1) the sending terminal 10 or the transmission path is overloaded and cannot handle the retransmission; (2) the retransmission function is interrupted to secure the resources of the sending terminal 10 or the transmission path in order to send data packets to more receiving terminals 11; (3) an application having strong real-time properties, such as TV telephone, is being used; (4) the user has joined a service in which retransmission is not performed; or (5) because of the classification of the data to be transmitted. The receiving terminals 11 that have received retransmission request forbidding notification packets do not make requests for retransmission even when packet loss is observed (do not request retransmission 200). The classification of data to be transmitted can conceivably be separated into data classifications such as frame types like I (Intra), P (Predictive), B (Bidirectionally predictive) for video; a sequence block such as GOP (Group of Pictures) for MPEG (Moving Picture Coding Experts Group); sound and non-sound portions for audio; header and payload portions for data structures; title and text body for text; or have priority level information added to the data in advance by the initiative of the editor or by an encoder. A relative first priority level is added to the respective data classifications, and the retransmission of information with a low first priority level is forbidden. For example, in the case of frame units, I frames are given a higher first priority level than P and B frames. This is because I frames can be decoded individually but P and B frames cannot be decoded individually. In the case of scene block units, the priority level of scene blocks the editor wishes to emphasize (in MPEG, scene blocks are generally reproduced in GOP units) is increased. As specific contents, the first priority level of scene blocks such as commercials is increased. In the case of audio, non-sound portions hold no meaning as information, and thus have a reduced first priority level. In the case of data structures, the header information is essential for decoding and reproduction, and thus has a higher first priority level than payload portions. In the case of text, title portions include more essential points than the text body, and thus have an increased first priority level. Thus the priority level is assigned, and the retransmission of data with a high priority level is permitted, whereas the retransmission of data with a low priority level is forbidden. Additionally, a second priority level can be allocated to each type of media, and the data for which retransmission is forbidden can be determined from the relationship between the first and second priority levels (for example, addition or subtraction of the priority level values). For the second priority level, higher priority levels are given in the order of control information, audio, and video, for example.

The sending terminal 10 sends retransmission request allowing notification packets to some or all of the receiving terminals 11 (RTCP packet 202) because (1) the sending terminal 10 or the transmission path moves from an overloaded state to a state with little load; (2) there are few receiving terminals 11 and resources for retransmitting data packets can be secured; (3) an application having weak real-time properties, such as VoD, is being used; (4) the user has subscribed to a service in which retransmission is performed; or (5) because of the classification of the data to be transmitted. The receiving terminals 11 that have received the retransmission request allowing notification packet can send retransmission request packets in case packet loss is observed (RTCP packet 203).

Figure 3:
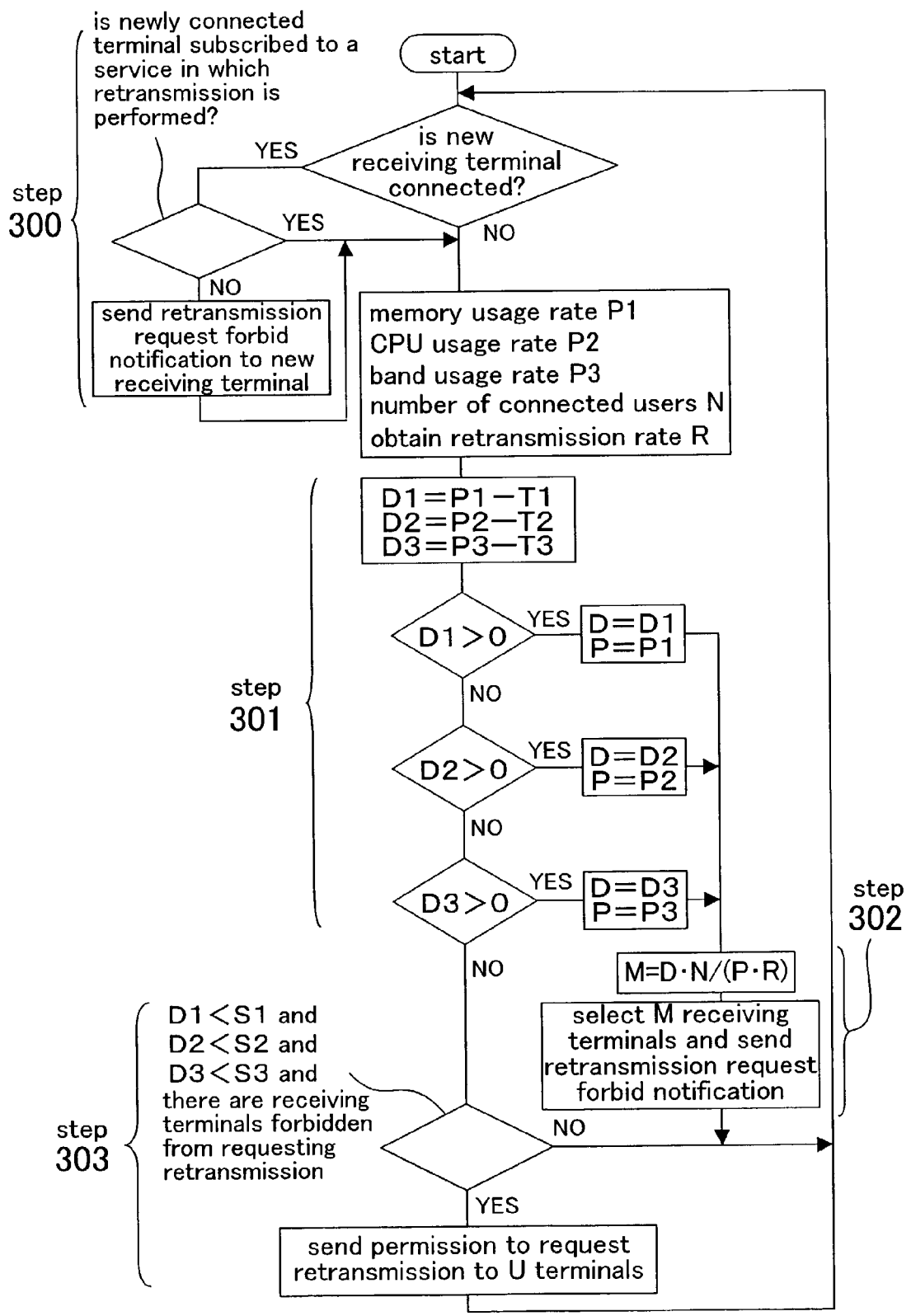
FIG. 3 is a flowchart for the control of retransmission according to the first embodiment of the present invention.

FIG. 3 is a flowchart depicting the operation of the retransmission control portion 102 when determining the sending of retransmission request forbid/allow notification packets based on the load of the sending terminal 10 or the transmission path and the service to which the user has subscribed. First, the retransmission control portion 102 determines whether there are newly connected receiving terminals. If there are newly connected receiving terminals, it determines whether those receiving terminals are subscribed to a service in which retransmission is performed. If they are not subscribed to such a service, the retransmission control portion 102 relays retransmission request forbidding notification packets to those receiving terminals and forbids retransmission requests from those receiving terminals. That is, retransmission request allowing notification packets are not sent to those receiving terminals (step 300).

Next, the retransmission control portion 102 obtains the memory usage rate, the CPU (Central Processing Unit) usage rate, and the band usage rate of the sending terminal 10, and compares each of those rates with their respective threshold values (step 301). When a usage rate P is greater than its threshold value T, that is, when the difference D between the usage rate P and its threshold value T is positive, a retransmission request forbidding notification packet is sent to the receiving terminals 11 so as to keep the usage rate within the tolerance range (step 302). At this time, the load F placed on the sending terminal 10 or the transmission path by retransmission is calculated as $F=P\times R$, based on the retransmission rate R (ratio of retransmitted packets to all sent packets) and the usage rate P. The retransmission load G per receiving terminal 11 is $G=F/N$, where N is the number of connected terminals. From these values, the number M of receiving terminals 11 to which retransmission request forbidding notification packets are to be sent to keep the load within the tolerance range is $M=D/G=D\times N/(P\times R)$. Next, M receiving terminals 11 are selected at random and retransmission request forbidding notification packets are sent to the selected receiving terminals 11.

If the memory usage rate, the CPU usage rate and the band usage rate are less than their threshold values, the sending terminal 10 and the transmission path are not overloaded, and thus retransmission request allowing notification packets are sent to U receiving terminals 11 (wherein U is a suitable, fixed value) (step 303).

Figure 4:
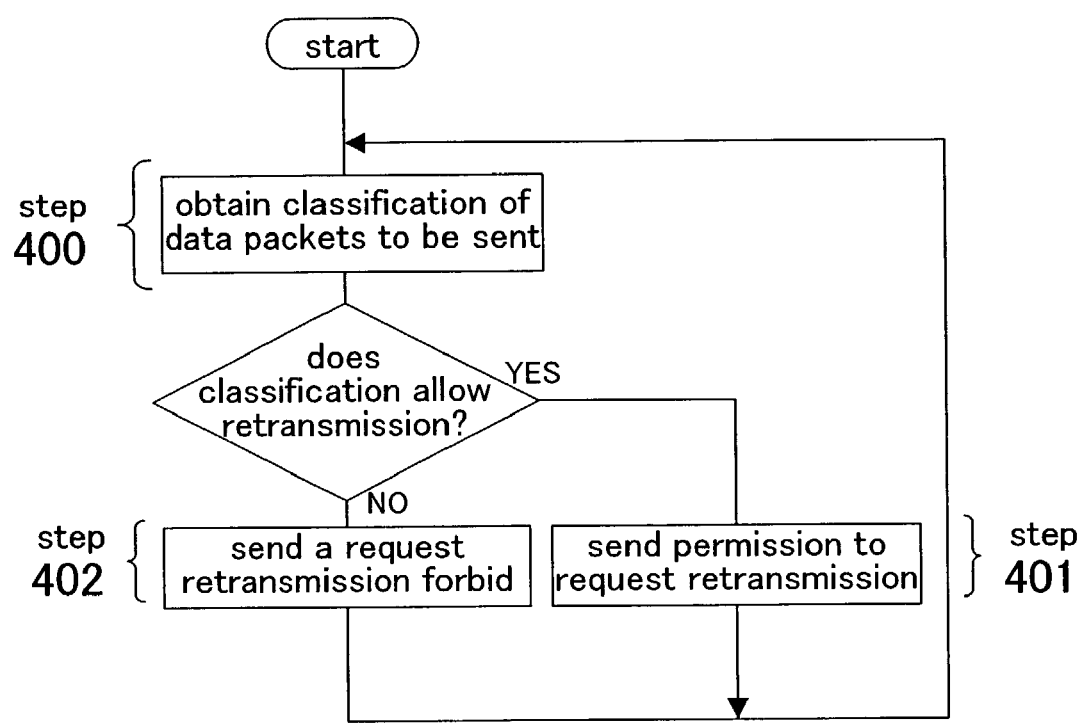
FIG. 4 is a flowchart for another control of retransmission according to the first embodiment of the present invention.

FIG. 4 is a flowchart depicting the operation of the retransmission control portion 102 when determining the sending of retransmission request forbid/allow notification packets in accordance with the classification of the data packets to be sent. First, the retransmission control portion 102 obtains the classification of the data packets to be sent (step 400). When the data packets to be sent are of a classification for which retransmission is allowed, the retransmission control portion 102 sends a retransmission request allowing notification packet (step 401). On the other hand, when the data packets to be sent are of a classification for which retransmission is not allowed, the retransmission control portion 102 sends a retransmission request forbidding notification packet (step 402).

It should be noted that the present embodiment can be suitably used not only in unicast networks, which is the scheme of ordinary IP (Internet Protocol) networks, but also, for example, in multicast and broadcast network schemes.

SECOND EMBODIMENT

The present embodiment is primarily for solving the aforementioned second problem by randomizing the retransmission requests of the receiving terminals.

Figure 5:
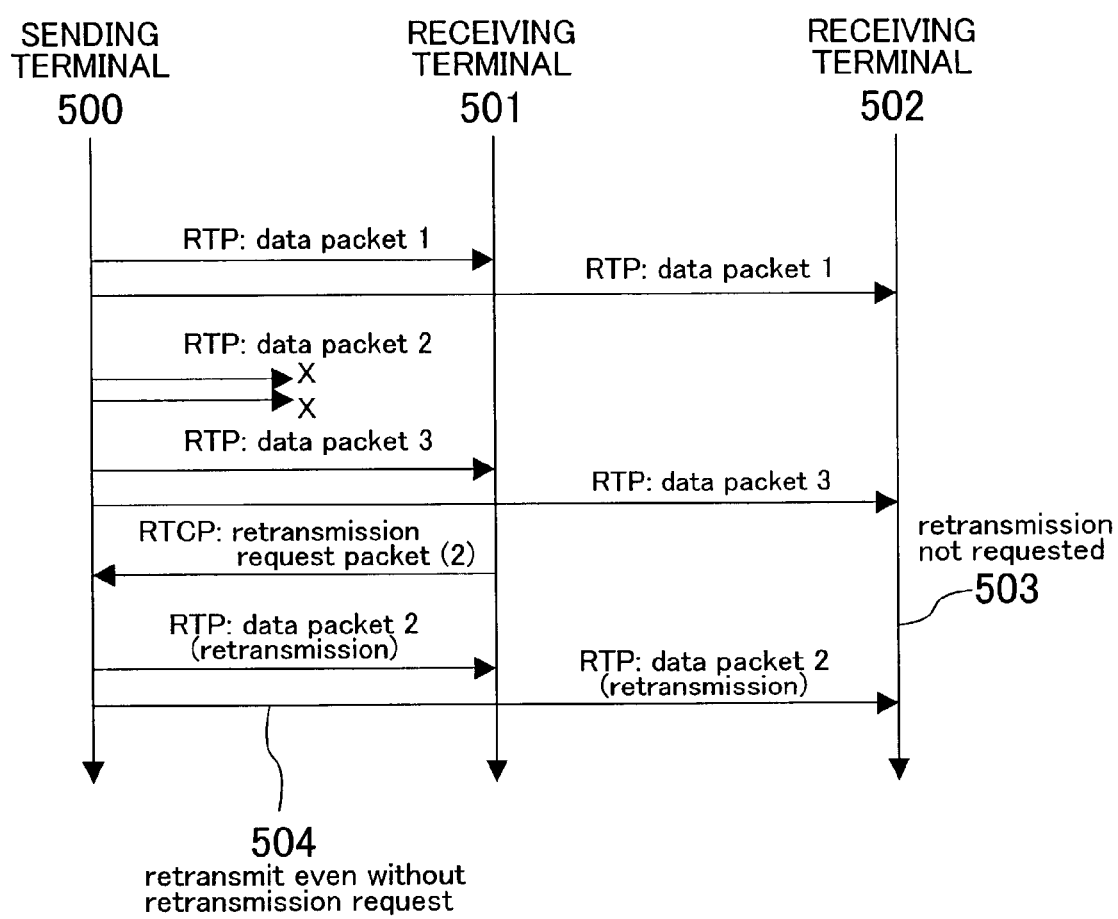
FIG. 5 is a sequence diagram between the sending terminal and a plurality of receiving terminals according to the second embodiment of the present invention.

FIG. 5 is a sequence diagram describing the sending/receiving method according to the present embodiment. In this example, RTP is used for the sending and receiving of data packets and RTCP is used for the sending and receiving of retransmission request packets, respectively. Observation of jumps in the sequence number of RTP packets serves as the method with which the receiving terminals 501 and 502 detect packet loss.

In FIG. 5, it is randomized whether the receiving terminals 501 and 502 send a retransmission request, and the result is that the receiving terminals 502 do not send a retransmission request packet even if packet loss occurs (503). A sending terminal 500 receiving the retransmission request packet from the receiving terminal 501 sends data packets to the receiving terminal 502 as well, even though it did not make a request for the retransmission of data packets (504). Thus, statistically the sending terminal 500 does not receive numerous retransmission request packets at once, and momentary overloading of the sending terminal 500 or the transmission path due to the reception of retransmission requests can be prevented. It should be noted that it is also possible to randomize the time from the detection of packet loss to the request for retransmission instead of whether to make the request for retransmission. It is also possible to reference past records of retransmission requests and group terminals with similar tendencies in making retransmission requests so as to carry out retransmission to group units.

THIRD EMBODIMENT

The present embodiment is primarily for solving the aforementioned third and fourth problems by sending loss notification packets from the gateway.

Figure 6:
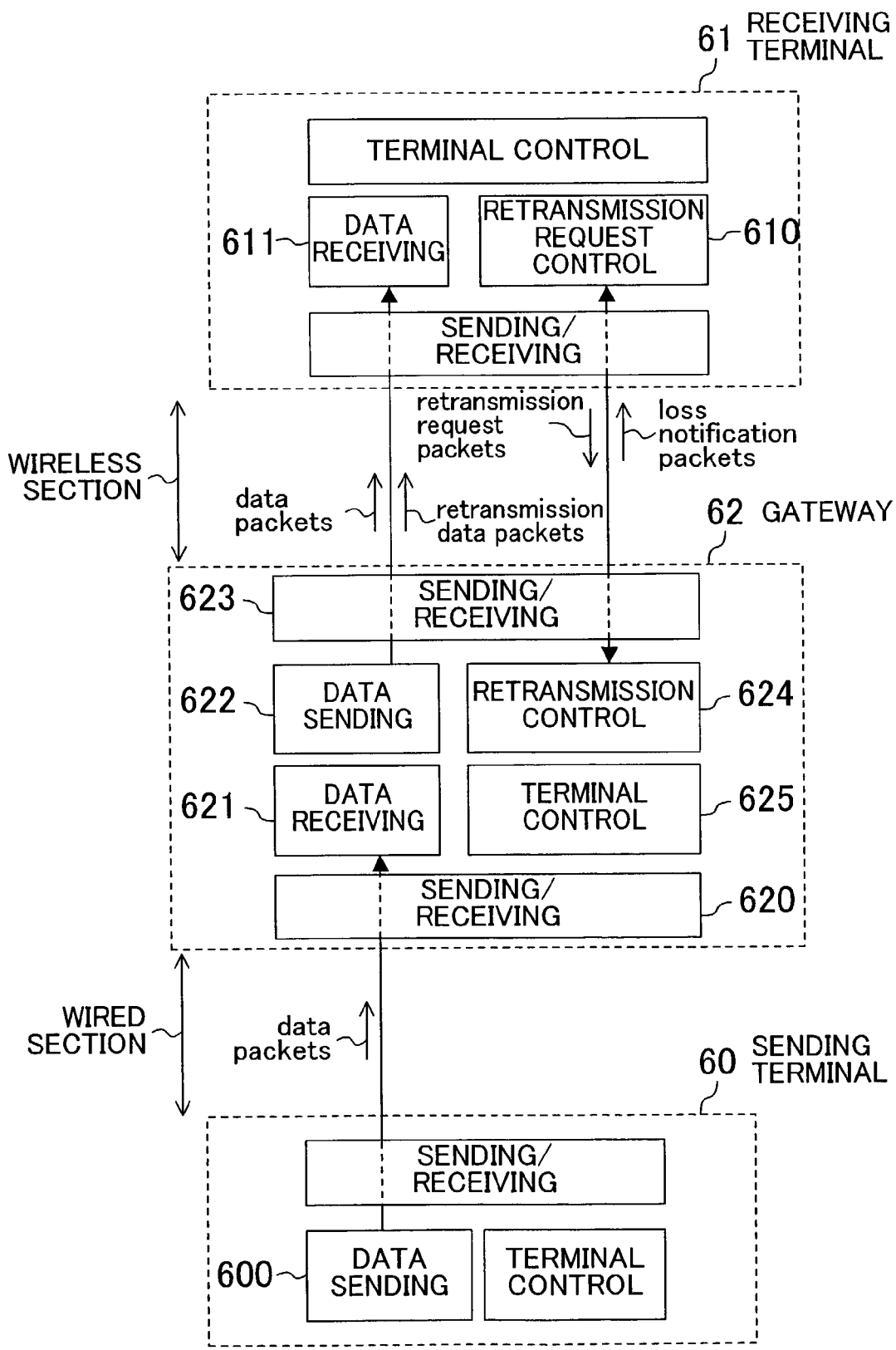
FIG. 6 is a schematic diagram illustrating an overall view of the third embodiment of the present invention.

FIG. 6 is a schematic drawing showing a overall view of the present embodiment. In FIG. 6, a sending terminal 60 is connected to a receiving terminal 61 via a gateway 62. The sending terminal 60 and the gateway 62 are connected to one another by a wired network, and the gateway 62 and the receiving terminal 61 are connected to one another by a wireless network. With this mode of connection, a case is conceivable in which the receiving terminal 61 is a mobile terminal, such as a portable telephone, connected to a server (sending terminal 60). This means, the server 60 and the gateway 62 are connected by a wired network such as an Ethernet or by ATM (Asynchronous Transfer Mode), and the receiving terminal 61 and the gateway 62 are connected by a wireless network such as a wireless LAN or by W-CDMA (Wideband Code Division Multiple Access). The same connection mode is used when a home network is configured, for example, by a wireless LAN or BlueTooth, and is connected to the Internet via a telephone line, for example, from a home gateway, for example, that connects the home network to an outside network. Conceivable applications include video distribution such as VoD and two-way communications such as TV telephone.

The sending terminal 60 is equivalent to the sending terminal 10 in FIG. 1 without the retransmission control portion 102 and the retransmission request forbid/allow control portion 104. The receiving terminal 61 is equivalent to the receiving terminal 11 in FIG. 1, except for its retransmission request control portion 610.

In the receiving terminal 61, the retransmission request control portion 610 is a means for observing packet loss and making retransmission requests to the gateway 62. However, it does not send retransmission request packets with respect to data packets indicated in loss notification packets sent from the gateway 62, even if it observes packet loss. It is possible to use a protocol for control information, such as RTCP, as the adopted protocol.

The gateway 62 is positioned between the sending terminal 60 and the receiving terminal 61, and is at the border portion between the wired section and the wireless section. In the gateway 62, sending/receiving portions 620 and 623, a data receiving portion 621, a data sending portion 622, and a terminal control portion 625 are equivalent to the sending/receiving portion 101, the data receiving portion 111, the data sending portion 100, and the terminal control portion 103 of FIG. 1, respectively. A retransmission control portion 624 is a means for receiving retransmission request packets from the receiving terminal 61 and commanding the data sending portion 622 to retransmit. It is also a means for sending a loss notification packet to the receiving terminal 61 when packet loss occurs in data packets received by the data receiving portion 621.

The information sent and received between the sending terminal 60 and the gateway 62 are data packets. The information sent and received between the gateway 62 and the receiving terminal 61 are retransmission request packets, loss notification packets, data packets, and retransmitted data packets. Retransmission request packets are sent from the retransmission request control portion 610 and are received by the retransmission control portion 624. Loss notification packets are sent from the retransmission control portion 624 and received by the retransmission request control portion 610. Data packets are sent from a data sending portion 600 and pass through the data receiving portion 621 and the data sending portion 622 before they are received by the data receiving portion 611. Retransmitted data packets are sent from the data sending portion 622 and received by the data receiving portion 611.

With this configuration the receiving terminal 61 does not make unnecessary retransmission requests to the gateway 62, and it is possible to solve the above-mentioned third problem.

It should be noted that in the present embodiment, the retransmitted data packets are sent using a channel for control information that is different from the channel for transmission of the data packets, but it is also possible to use the channel for data transmission and send the retransmitted data packets in place of the lost data packets.

Also, in the present embodiment, the retransmission requests are processed by the gateway 62, but it is also possible that the gateway 62 only sends the loss notification packets and that the retransmission requests are processed by the sending terminal 60. With this configuration, the receiving terminal 61 performs a retransmission request only for loss on the wireless network, so compared to a case in which retransmission is performed between the sending terminal 60 and the receiving terminal 61 without sending loss notification packets, it is possible to prevent a worsening of the congestion in the wired section due to retransmission.

Figure 7:
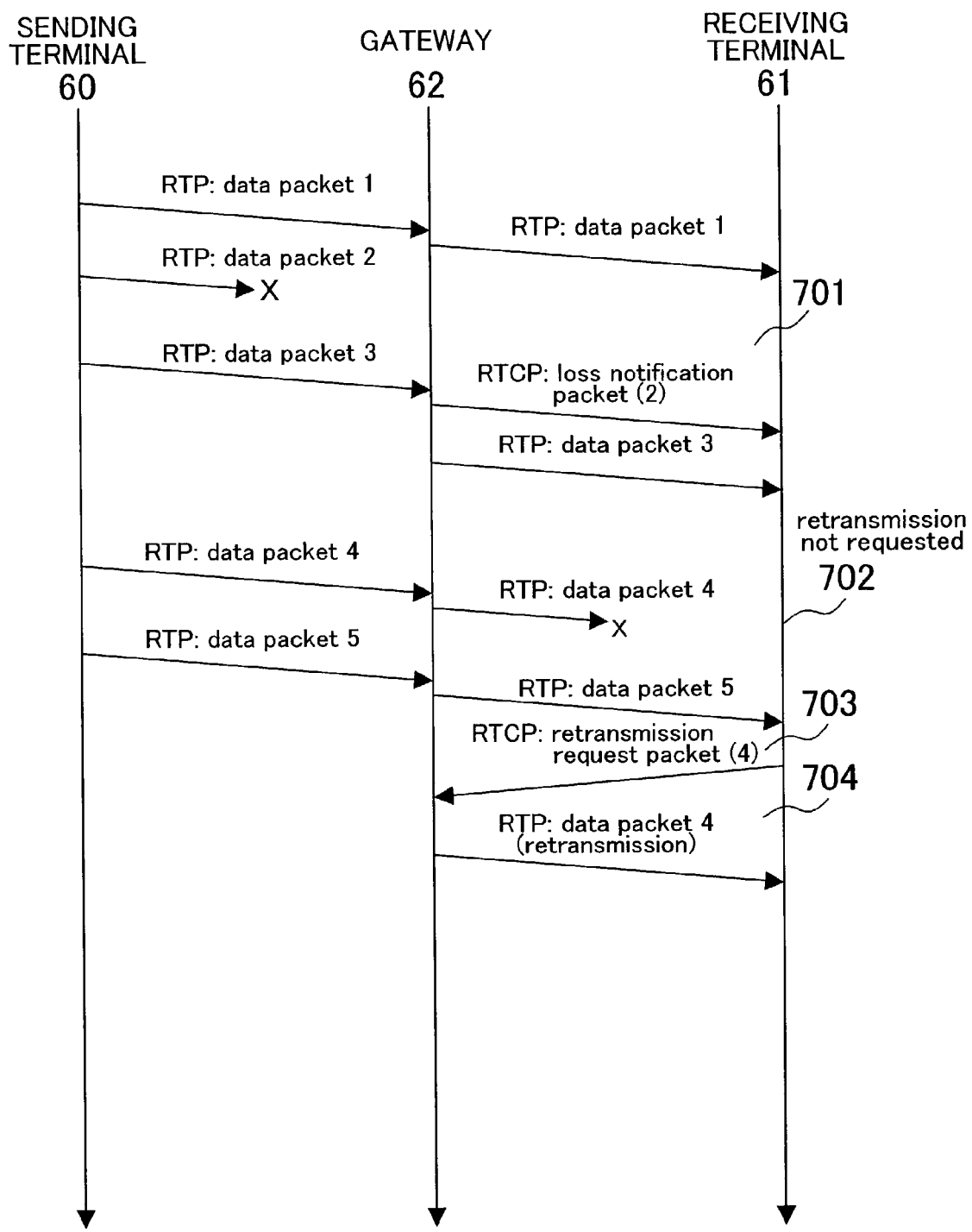
FIG. 7 is a sequence diagram between the sending terminal and the receiving terminal according to the third embodiment of the present invention.

FIG. 7 is a sequence diagram of a case in which RTP is used to send/receive data packets, and RTCP is used to send/receive retransmission request packets and loss notification packets. Also, in this example, the method for detecting packet loss at the receiving terminal 61 is the observation of missing sequence numbers of the RTP packets.

The gateway 62 sends loss notification packets to the receiving terminal 61 when loss of the data packets from the sending terminal 60 is observed. In FIG. 7, the loss of a data packet 2 is detected, so a loss notification packet indicating that the data packet 2 has been lost is sent (701). It should be noted that a loss notification packet can be sent bundled with information regarding a plurality of packet losses. Taking into account the possibility that loss notification packets may be lost, it is also possible to send the information of the loss of data packets a plurality of times. When a loss notification packet is received, the receiving terminal 61 does not send a retransmission request packet for the packet indicated by the loss notification packet, even if the loss of an RTP packet has been observed (702). When the receiving terminal 61 observes packet loss without having received a loss notification packet, it sends a retransmission request packet. In FIG. 7, the receiving terminal 61 sends a retransmission request packet because it has confirmed the loss of an RTP data packet 4 (703). The gateway 62 sends the retransmit packet response to the retransmission request. In FIG. 7, the retransmission of the data packet 4 is requested, and is retransmitted in accordance with that request (704).

FIG. 8 and FIGS. 9(a) to 9(c) are examples of formats for when RTCP is used as the protocol for sending the retransmission request forbid/allow notification packets and the loss notification packets.

In FIG. 8, version 801, padding 802, packet type 804, length 805, and SSRC 806 are identical in meaning to other RTCP packets. An identifier is entered into the packet type 804 to indicate, for example, that the packet is a notification regarding the forbidding of retransmission requests. An identifier is entered into SubType 807 to express whether the packet is a retransmission request forbid notification, a retransmission request allow notification, or a packet loss notification. For example, SubType=0 can mean a retransmission request forbid notification, SubType=1 can mean a packet loss notification, and SubType=2 can mean a retransmission request allow notification. The structure of a retransmission request forbid notification portion 808 changes depending on the value of the SubType 807.

FIG. 9(*a*) is an example of a format in which the SubType 807 is an identifier representing retransmission request forbidding or retransmission request allowing, that is, when SubType=0 or 2. A padding 901 is the padding bit for byte align, and the inputted value has no meaning. In the sequence number 902, the sequence number of the data packet starting the forbidding or allowing of retransmission requests is entered.

FIGS. 9(*b*) and 9(*c*) are examples of a format in which the SubType 807 is packet loss notification, that is, when SubType=1. A format type (FT) 903 is an identifier showing which of the several loss notification packet formats is being used, and for example is one of 000, 001, 010, 011, and 111. The format after the format type 903 further changes as shown in FIG. 9(*b*) and FIG. 9(*c*) depending on the value that is inputted into the format type 903.

When the identifier input into the format type (FT) is a number other than 111, the format of FIG. 9(*b*) is used. A padding 904 is the padding bit for bit align, so the inputted value has no meaning. In sequence number 905, an RTP sequence number representing the lost packets is entered. Setting the identifier of the format type 903 to FT=000 to 010 makes it possible to indicate how many packets have been lost by the value inputted for the sequence number 905. Alternatively, by setting the identifier of the format type 903 to FT=011, it is possible to indicate using the sequence numbers 905 and 906 that all RTP packets in this segment have been lost.

When the identifier that is input into the format type (FT) is 111, the state of packet loss is expressed using the format shown in the FIG. 9(*c*). A sequence number 908 expresses which sequence number packet the header bit of the bit sequence indicating the state of loss of the packets expressed by a bit map 909 corresponds to. The bit map 909 indicates with the n-th number bit from the head the value inputted as the sequence number 908 plus the state of packet loss of the n-th number packet, and for example a "1" is entered if the packet has been lost and a "0" is entered if the packet has not been lost. A length 907 expresses the length of the bit map 909, and indicates up to which bit of the bit sequence the last 32-bit word represented by the length 805 in FIG. 8 is valid.

It is also possible to express a plurality of information sets by taking any of the formats illustrated in FIGS. 9(*a*) to (*c*) as a single element and ordering the elements into a sequence. However, if the format of FIG. 9(*c*) is used, it must be positioned at the very end of the element sequence. For the element count 803 in FIG. 8, a value is input which expresses the number of elements included in the retransmission request forbid notification portion 808.

Thus, the loss notification packets from the gateway 62 are used in the calculation of the packet loss rate on the wireless section, and based on the packet loss rates of the wireless section and the wired section, it is possible to determine the robustness of the data packets and determine the transmission rate. More specifically, loss notification packets from the gateway 62 are for notifying the packet loss number of the wired section, and the packet loss number observed by the receiving terminal 61 is the number of packets lost on both the wired and wireless sections. Consequently, (number of lost packets observed by the receiving terminal 61)−(number of lost packets notified by loss notification packets)=(number of packets lost on the wireless section), and by receiving the loss notification packets, the receiving terminal 61 can ascertain the number of packets lost in the wireless section and the number of packets lost in the wired section. From these values, the packet loss rates of the wired section and the wireless section are calculated and reported to the sending terminal 60, which determines the transmission rate and the robustness of the data packets based on these packet loss rates. Thus, the above-mentioned fourth problem can be solved. The following embodiments provide a more detailed explanation of how the fourth problem is solved.

FOURTH EMBODIMENT

Figure 10:
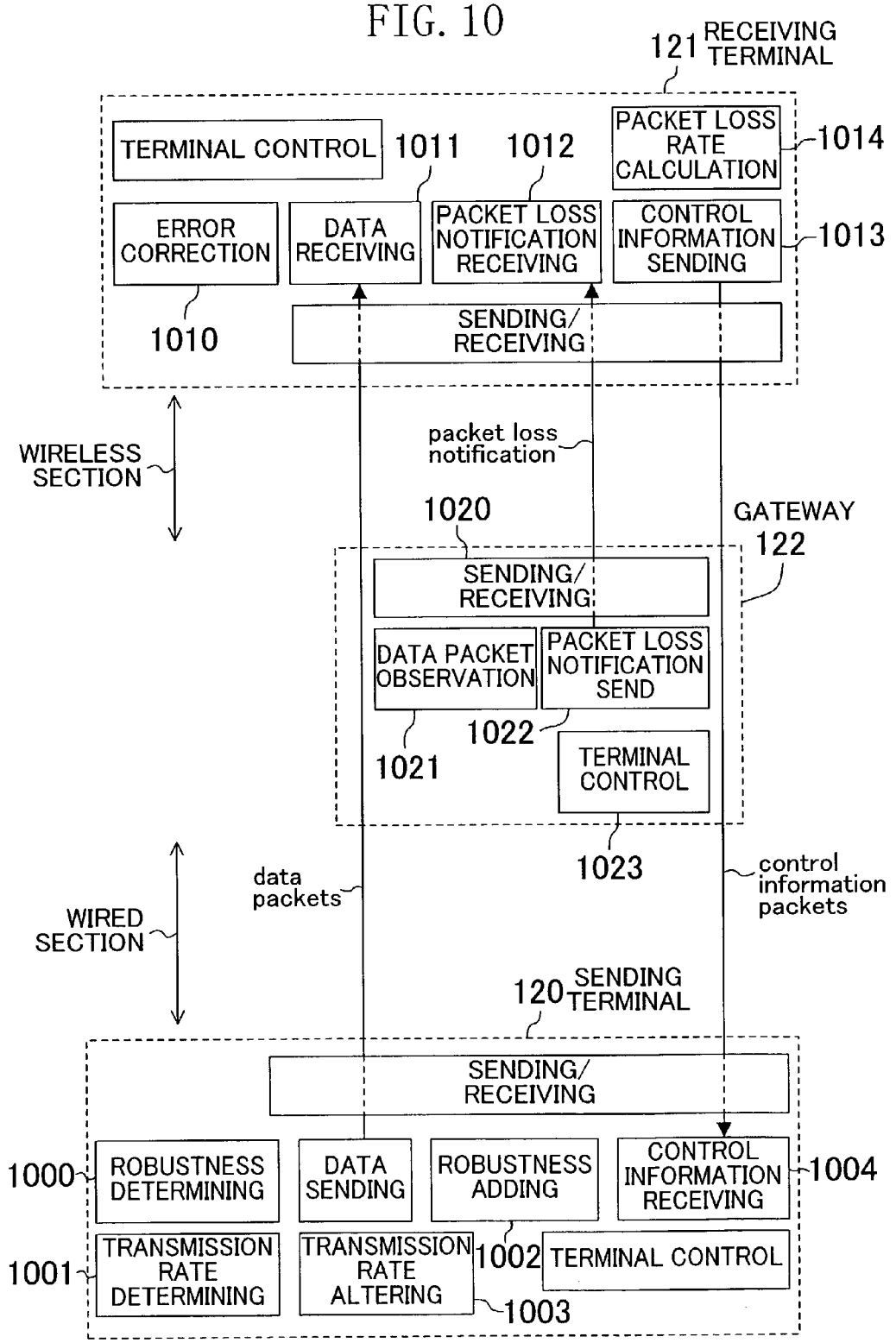
FIG. 10 is a schematic diagram illustrating an overall view of the fourth embodiment of the present invention.

FIG. 10 is a schematic drawing showing an overall view of the present embodiment. In FIG. 10, a sending terminal 120 is connected to a receiving terminal 121 via a gateway 122. The sending terminal 120 and the gateway 122 are connected by a wired network, and the gateway 122 and the receiving terminal 121 are connected by a wireless network.

The gateway 122 monitors data packets from the sending terminal 120, and when there is packet loss, it uses a packet loss notification to notify the receiving terminal 121 that packet loss has occurred. In the gateway 122, a sending/receiving portion 1020 is equivalent to the sending/receiving portion 623 of FIG. 6.

A data packet observation portion 1021 is a means for detecting the packet loss of data packets from the sending terminal 120 and notifying a packet loss notification send portion 1022. Packet loss can be detected by missing sequence numbers, which have been added to the data packets.

Based on the packet loss information reported from the data packet observation portion 1021, the packet loss notification send portion 1022 creates a packet loss notification indicating that packet loss has occurred and sends it to the receiving terminal 121. It should be noted that it is also possible to use the format shown in FIGS. 8 and 9(*b*) as the format for the packet loss notification. The packet loss notification that is created in the packet loss notification send portion 1022 is for reporting that packet loss has occurred on the transmission path between the sending terminal 120 and the gateway 122, and therefore reports packet loss on the wired section.

A terminal control portion 1023 is a means for the integrated control of these various portions.

A receiving terminal 121 is the receiving terminal 61 of FIG. 6 without the retransmission request control portion 610 and further including a packet loss rate calculation portion 1014, an error correction portion 1010, a packet loss notification receiving portion 1012, and a control information sending portion 1013.

A data receiving portion 1011 in the receiving terminal 121 is a means for receiving data packets from the sending terminal 120, if necessary reordering the packets into sequence number order, if necessary unpacking the packets, if necessary decoding, and transferring the data to outputs such as a monitor, speaker, file, or shared memory. It is also a means for storing the sequence number with the largest value of the sequence numbers of the received data packets as the maximum sequence number, and also for detecting packet loss in the data packets from missing sequence numbers of the data packets and calculating the number of lost data packets.

The packet loss notification receiving portion 1012 is a means for receiving the packet loss notification from the gateway 122, and from the information of the packet loss in the wired section that is included in this notification, obtaining the number of packets loss in the wired section.

The packet loss rate calculation portion 1014 is a means for calculating the packet loss rates of the wired section and the wireless section from the packet loss number observed in the data receiving portion 1011 and the packet loss number in the wired section notified from the packet loss notification receiving portion 1012.

The control information sending portion 1013 is a means for inputting the packet loss rates of the wired and wireless sections, which have been calculated by the packet loss rate calculation portion 1014, to control information packets and sending these packets to the sending terminal 120.

The error correction portion 1010 is a means for monitoring data received by the data receiving portion 1011 and for restoring lost packets, if possible, when it detects packet loss. It is possible to use the method disclosed in RFC2733 as the method for restoring lost packets.

The sending terminal 120 is equivalent to the sending terminal 60 of FIG. 6 further including a robustness determining portion 1000, a transmission rate determining portion 1001, a robustness adding portion 1002, a transmission rate altering portion 1003, and a control information receiving portion 1004.

The control information receiving portion 1004 is a means for obtaining the respective packet loss rates of the wired and wireless sections from the control information packets sent by the receiving terminal 121.

The robustness determining portion 1000 is a means for determining the robustness to be added to the data packets from the packet loss rate of the wireless section, which is obtained by the control information receiving portion 1004.

The transmission rate determining portion 1001 is a means for determining the transmission rate from the packet loss rate of the wired section, which is obtained by the control information receiving portion 1004. As the algorithm for this, it is possible to suitably use a DDA algorithm (D. Sisalem et al., "The Direct Adjustment Algorithm: A TCP-Friendly Adaptation Scheme", Technical Report GMD-FOKUS, August 1997. Available from http://www.fokus.g-md.dc/usr/sisalem) or an LDA algorithm (D. Sisalem et al., "The Loss-Delay Based Adjustment Algorithm: A TCP-Friendly Adaptation Scheme", in the proceedings of NOSS-DAV'98, July, Cambridge, UK), for example.

The robustness adding portion 1002 is a means for adding to the sent data the robustness that is reported from the robustness determining portion 1000. As the robustness to be added, if for example MPEG4 is used as the encoding method for video data, then it is possible to add robustness by altering the insertion interval of I frames, the data packet size, the number of macroblocks per frame in which AIR (Adaptive Intra Refresh) is performed, the period of the CIR (Constant Intra Refresh), the insertion method of the HEC (Header Extension Code), or the insertion interval of FEC packets defined by RFC2733, for example.

It should be noted that apart from the robustness adding portion 1002 adding robustness to the data packets themselves, if the packet loss rate of the wireless region is large, it is also possible for the control information sending portion 1013 to strengthen the robustness by shortening the notification interval of control information packets reporting the packet loss rates of the wired section and wireless section. When the send interval of the control information packets is shortened the effect is a stronger robustness (1) in the aspect that the number of times that control information packets are sent increases and thus there is a higher redundancy of the control information, which results in the effect of strengthening the robustness of the control information packets themselves, and (2) in the aspect that when packet loss occurs in the wireless section, it becomes possible to quickly increase the robustness.

The transmission rate altering portion 1003 is a means for altering the transmission rate of the data packets to the transmission rate determined by the transmission rate determining portion 1001.

Figure 11:
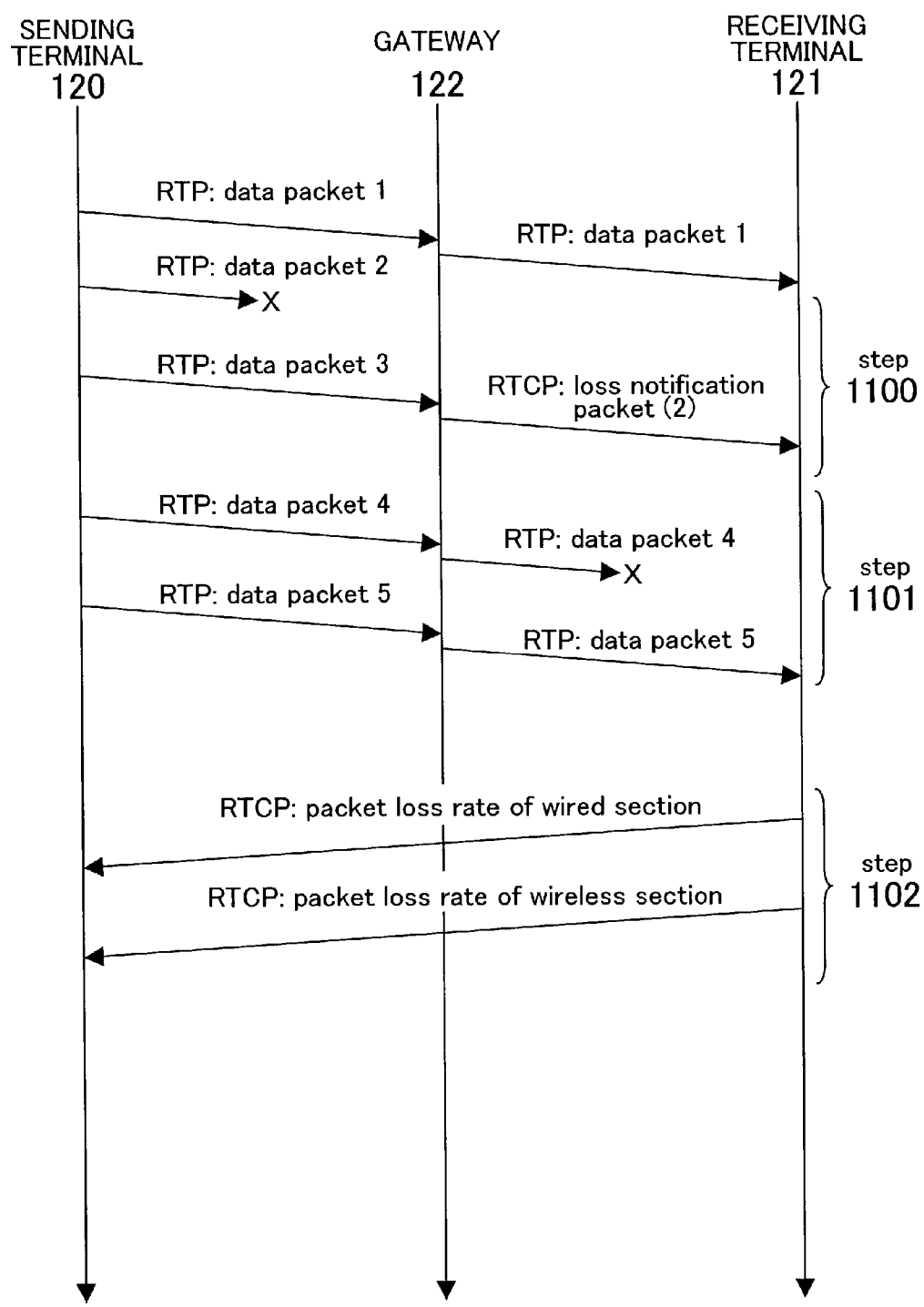
FIG. 11 is a sequence diagram between the sending terminal and the receiving terminal according to the fourth embodiment of the present invention.

FIG. 11 is a sequence diagram illustrating the operation of the present embodiment. When the sending terminal 120 sends data packets to the receiving terminal 121, and packet loss occurs in the wired section between the sending terminal 120 and the gateway 122, then the gateway 122 detects the packet loss from the missing sequence numbers and a packet loss notification is sent (step 1100) by the gateway 122. On the other hand, if data packet loss occurs in the wireless section between the gateway 122 and the receiving terminal 121, then no packet loss notification is sent by the gateway 122 (step 1101). The receiving terminal 121 calculates the packet loss rate in the wireless section and the packet loss rate in the wired section for a certain time period from the packet loss detected by the receiving terminal 121 and the packet loss notification from the gateway 122, and using the RTCP notifies the sending terminal 120 (step 1102). The sending terminal 120 is able to ascertain the packet loss rates in the wired and wireless sections from the RTCP packets received in step 1102, and based on these values determines the transmission rate and the robustness of the data packets.

Figure 12:
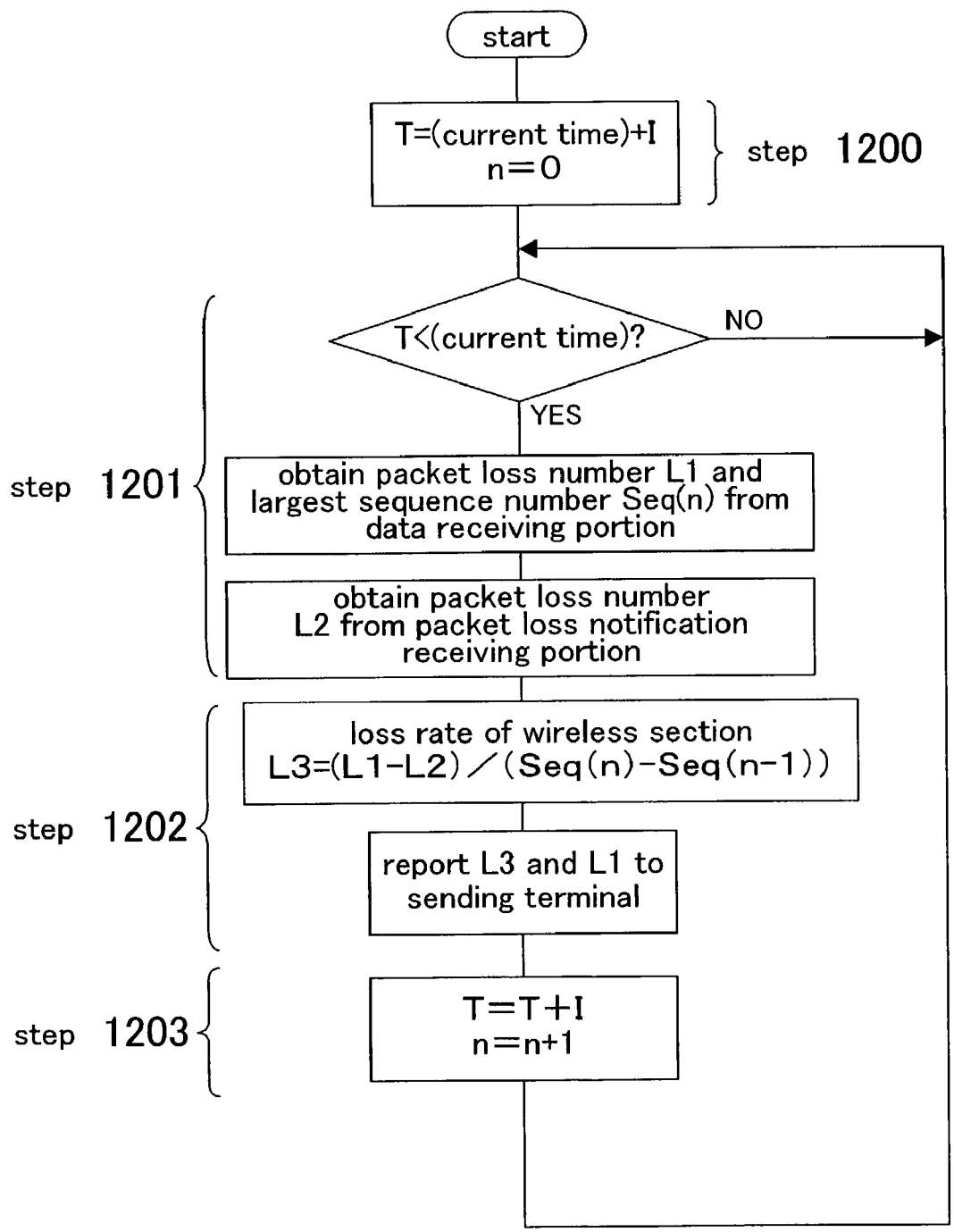
FIG. 12 is a flowchart showing the procedure for calculating the packet loss rate according to the fourth embodiment of the present invention.

FIG. 12 is a flowchart illustrating the method for calculating the packet loss rates of the wired section and the wireless section with the packet loss rate calculation portion 1014. The packet loss rate calculation portion 1014 is activated as soon as reception of the data packets begins, and first sets a timer for determining the notification time for reporting the packet loss rates in the wireless and wired sections to the sending terminal 120 (step 1200). In the present flowchart, the send interval is given as "I." Then, when it becomes the notification time, the number of lost packets observed by the receiving terminal 121 during the past time I and the maximum sequence number of the received data packets are obtained from the data receiving portion 1011. Additionally, the number of data packets lost during the past time I is obtained from the packet loss notification receiving portion 1012 (step 1201). Based on these values, the packet loss rate of the wireless section is determined, and the packet loss rates of the wireless and wired sections are reported to the sending terminal 120 (step 1202). Lastly, the next notification time is determined (step 1203), and the procedure returns to step 1201.

Figure 13:
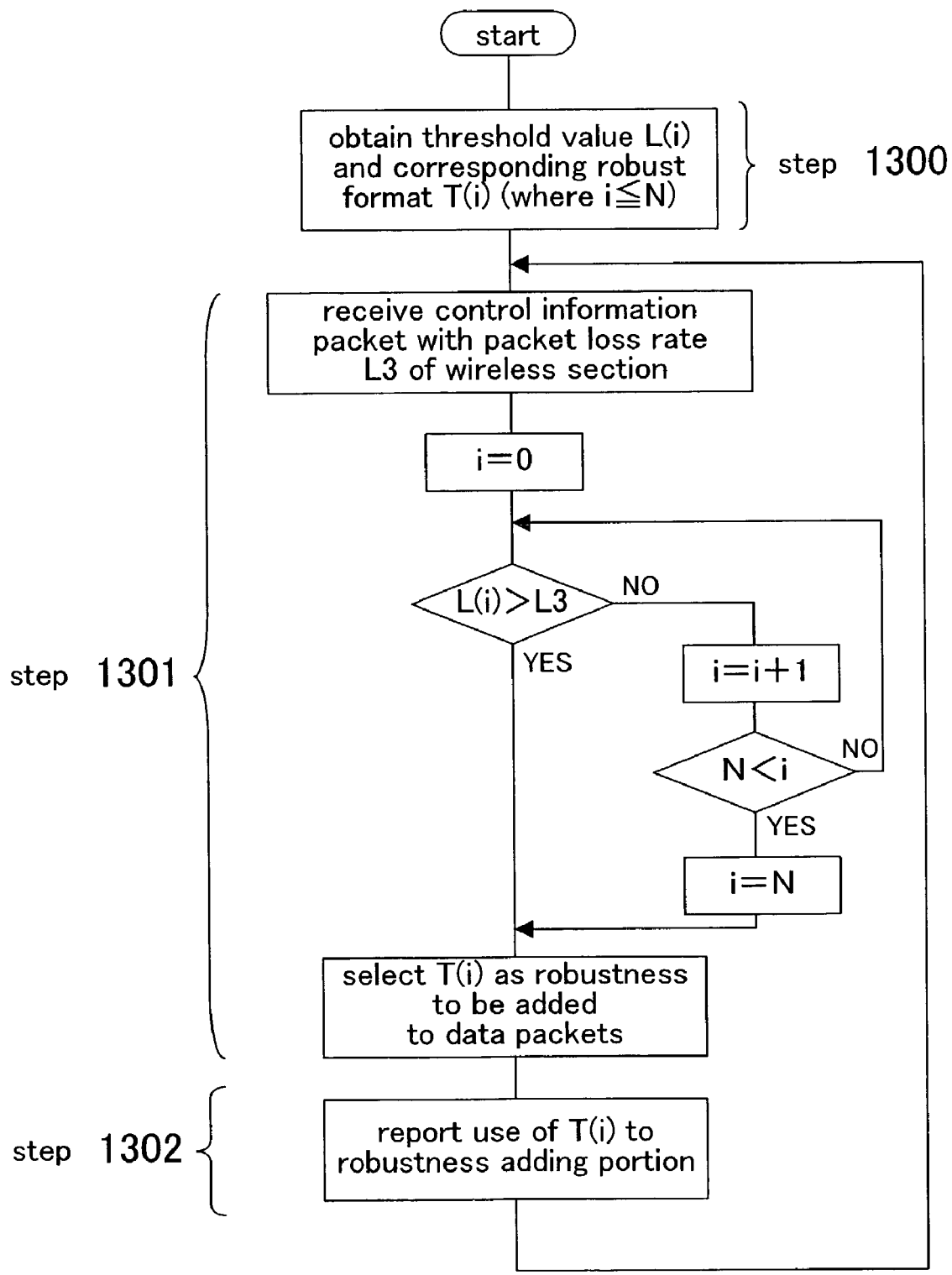
FIG. 13 is a flowchart showing the procedure for determining the error correction strength according to the fourth embodiment of the present invention.

FIG. 13 is a flowchart showing the algorithm of the robustness determining portion 1000 for determining the error strength to add to the data packets. The robustness determining portion 1000 is activated with the start of data transmission and first obtains a correlation chart of the threshold value L(i) and the corresponding robustness method T(i) from files, for example, accumulated in the sending terminal 120 (step 1300). Here this correlation chart is a chart for determining the robustness to be added to the data packets when the packet loss rate of the wireless section is within a particular threshold value range, as shown in FIG.

14. Next, when a control information packet, in which the packet loss rate L3 of the wireless section has been entered, is received, the threshold value L(i) and L3 are compared and the corresponding robustness method is selected (step 1301). The result is notified to the robustness adding portion 1002 (step 1302), and the procedure returns to step 1301.

It should be noted that in the above example the receiving terminal 121 uses the RTCP, for example, to report the packet loss rate of the wired section and the packet loss rate of the wireless section to the sending terminal 120, and the sending terminal 120 controls the transmission rate and adds the robustness based on these values, however, it is also possible to let the receiving terminal 121 have the transmission rate determining portion 1001 and the robustness determining portion 1000, and to let the receiving terminal 121 determine the transmission rate and the robustness.

It is also possible to make a notification regarding the congestion at the gateway 122 instead of notifying of the packet loss. For example, in a case where congestion occurs in the gateway 122 and the queue length of the gateway 122 becomes larger than a certain threshold value, the receiving terminal 121 may be notified that congestion has occurred by the same method as that for notifying of the packet loss. This means that instead of notifying that there are lost packets, a notification is made regarding the packets arriving when the queue length of the gateway 122 is longer than the threshold value. When there is congestion, the receiving terminal 121 notifies the sending terminal 120 to reduce the transmission rate in the same way as when a packet loss notification is received, and when there is no congestion, it instructs the sending terminal 120 to raise the transmission rate. With this method, the transmission rate is reduced before packet loss occurs in the wired section, and thus no packet loss occurs in the wired section. Consequently, the receiving terminal 121 becomes capable of determining that all of the observed packet loss is packet loss in the wireless section, and the observed packet loss number can be used in altering the strength of the robustness. It is also possible to enter into the congestion notification a value which expresses the condition of the congestion (for example, no congestion: 1, small congestion: 2, large congestion: 3) rather than just expressing by a binary value whether or not congestion has occurred.

FIFTH EMBODIMENT

In the fourth embodiment, the packet loss rate of the wireless section was calculated in the receiving terminal 121, but it is also possible to calculate the packet loss rate of the wireless section in the sending terminal 120 or the gateway 122. In the present embodiment, the configuration is such that the packet loss rate of the wireless section is calculated in a sending terminal 150, as shown in FIG. 15.

The sending terminal 150 is equivalent to the sending terminal 120 of FIG. 10 further provided with a packet loss notification receiving portion 1504 and a packet loss rate calculation portion 1505. A packet loss notification is sent to the sending terminal 150 from a packet loss notification sending portion 1520 of a gateway 152. In this case, the packet loss rate that is observed by a receiving terminal 151 is notified to the sending terminal 150 by a control information sending portion 1510.

Figure 15:
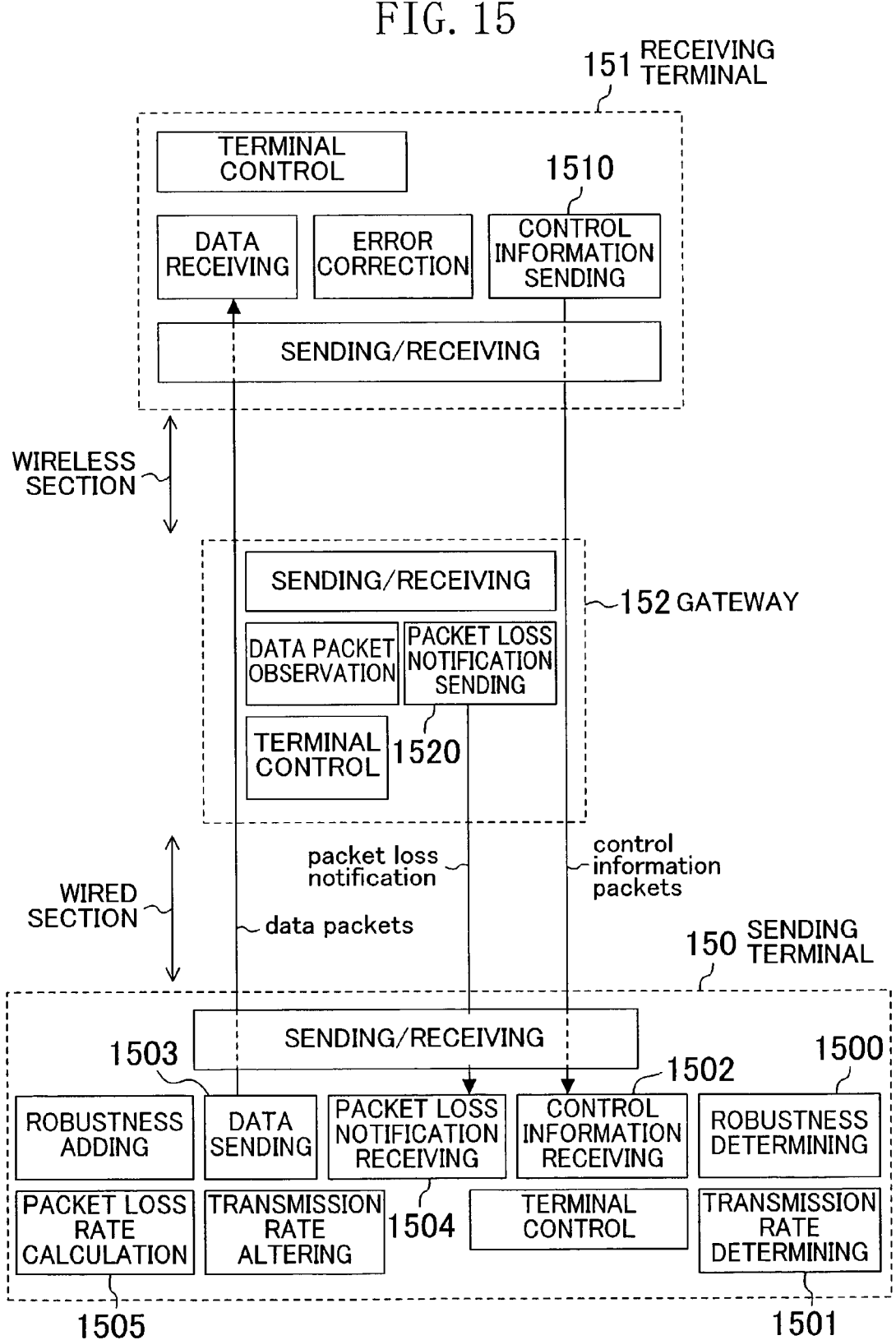
FIG. 15 is a schematic diagram illustrating an overall view of the fifth embodiment of the present invention.
Figure 16:
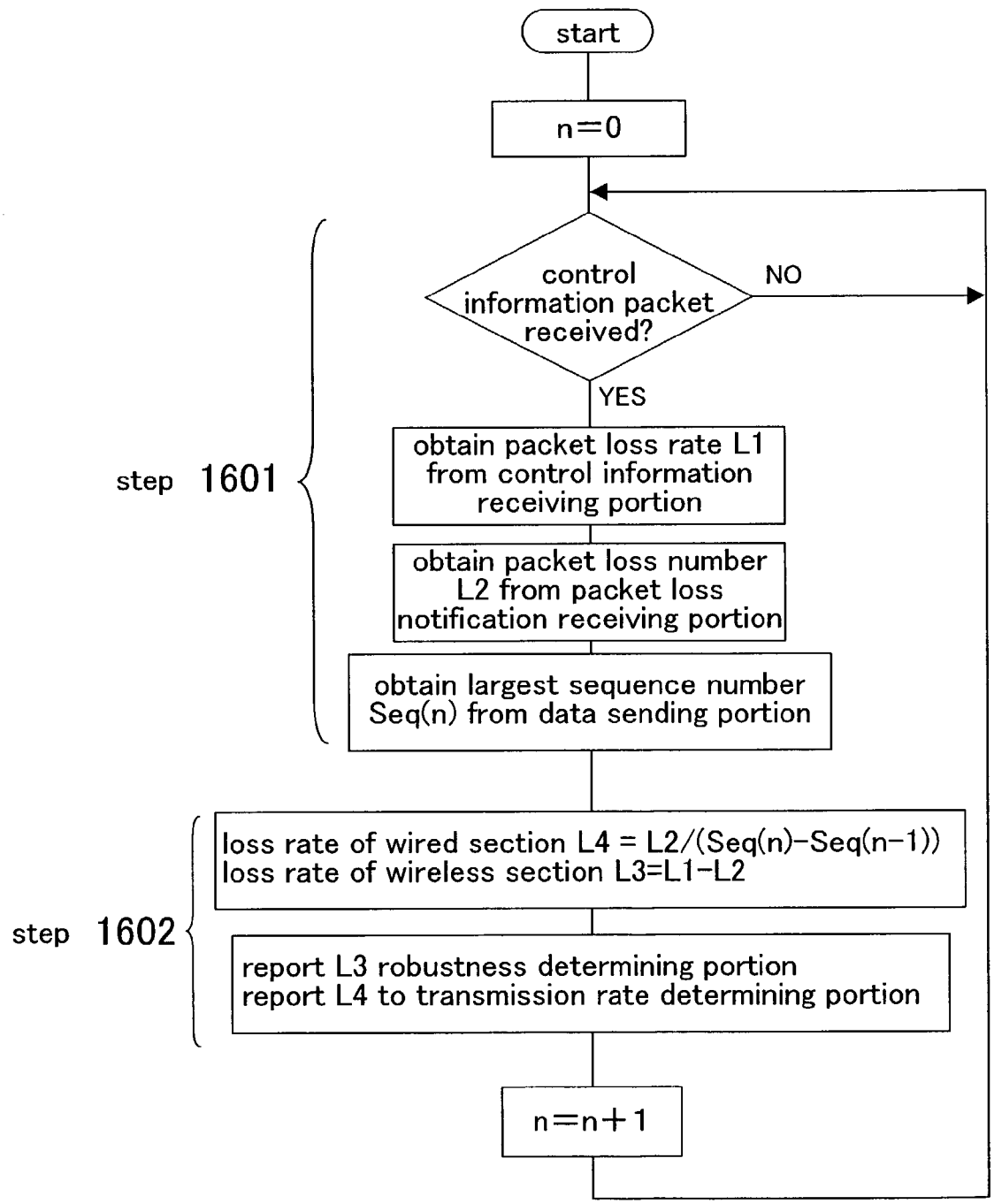
FIG. 16. is a flowchart showing the procedure for calculating the packet loss rate according to the fifth embodiment of the present invention.

FIG. 16 is a flowchart illustrating the method for calculating the packet loss rate with the packet loss rate calculating portion 1505 according to the configuration of FIG. 15. The packet loss rate calculation portion 1505 obtains the packet loss rate observed by the receiving terminal 151 from control information packets when they are received by a control information receiving portion 1502. Additionally, it obtains from the packet loss notification receiving portion 1504 the number of data packets lost during the period from when the previous control information packets are received to when the current control information packets are received. Furthermore, it obtains the maximum sequence number of the data packets sent from a data sending portion 1503 (step 1601). Based on these values, the packet loss rate of the wireless section and the packet loss rate of the wired section are determined, the packet loss rate of the wireless section is notified to a robustness determining portion 1500 and the packet loss rate of the wired section is notified to a transmission rate determining portion 1501 (1602), and the procedure returns to step 1601.

SIXTH EMBODIMENT

Figure 17:
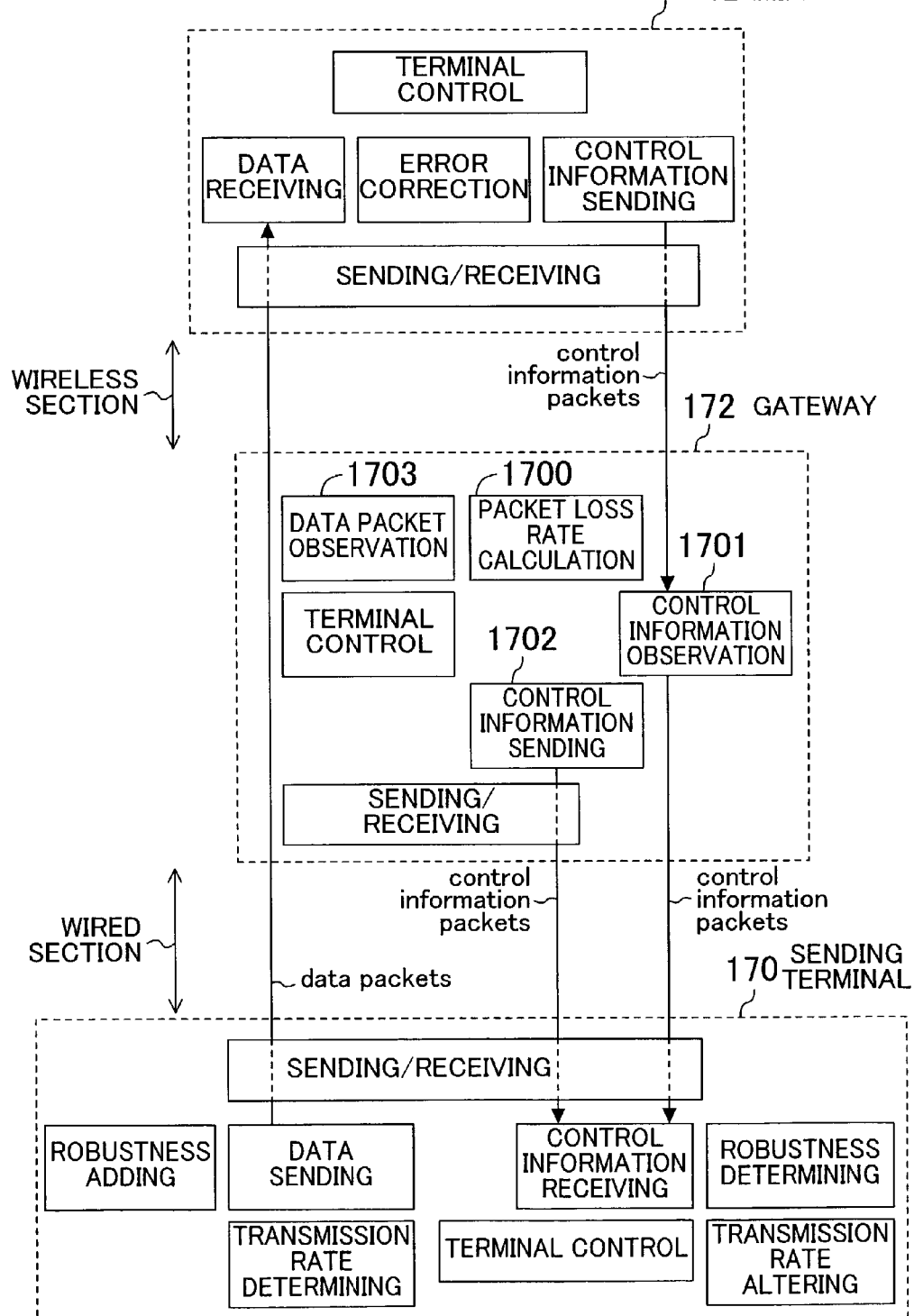
FIG. 17 is a schematic diagram illustrating an overall view of the sixth embodiment of the present invention.

The present embodiment is configured such that the packet loss rate of the wireless section is calculated in a gateway 172, as shown in FIG. 17.

FIG. 17 is equivalent to removing the packet loss notification send portion 1022 and the packet loss notification receiving portion 1012 from the configuration of FIG. 10, and further adding a packet loss rate calculation portion 1700, a control information observation portion 1701, and a control information sending portion 1702 to the gateway 122 in FIG. 10.

The control information observation portion 1701 is a means for receiving control information packets sent from a receiving terminal 171 and for obtaining the packet loss rate observed by the receiving terminal 171, which is included in the control information packets. It is also a means for inputting the packet loss number of the wired section observed by a data packet observation portion 1703 into the received control information packets and sending those packets.

The packet loss rate calculation portion 1700 is a means for calculating the packet loss rate of the wireless section from the number of packets lost on the wired section as observed by the data packet observation portion 1703 and the packet loss rate of the receiving terminal 171 obtained by the control information observation portion 1701.

The control information sending portion 1702 is a means for sending to a sending terminal 170 the packet loss rate of the wireless section calculated by the packet loss rate calculation portion 1700 as control information packets. It is presumed that the protocol used is RTCP.

With the configuration shown in FIG. 17, the packet loss rate of the wireless section is calculated by the gateway 172 and the resulting value is reported to the sending terminal 170. Viewed from the sending terminal 170, the received control information packets are the same as those received in the configuration of FIG. 10, except that the transmission source of the control information packets is different. Consequently, with the configuration shown in FIG. 17, the present invention can be worked with a configuration in which the packet loss of the wireless section is calculated by the gateway 172.

SEVENTH EMBODIMENT

Figure 18:
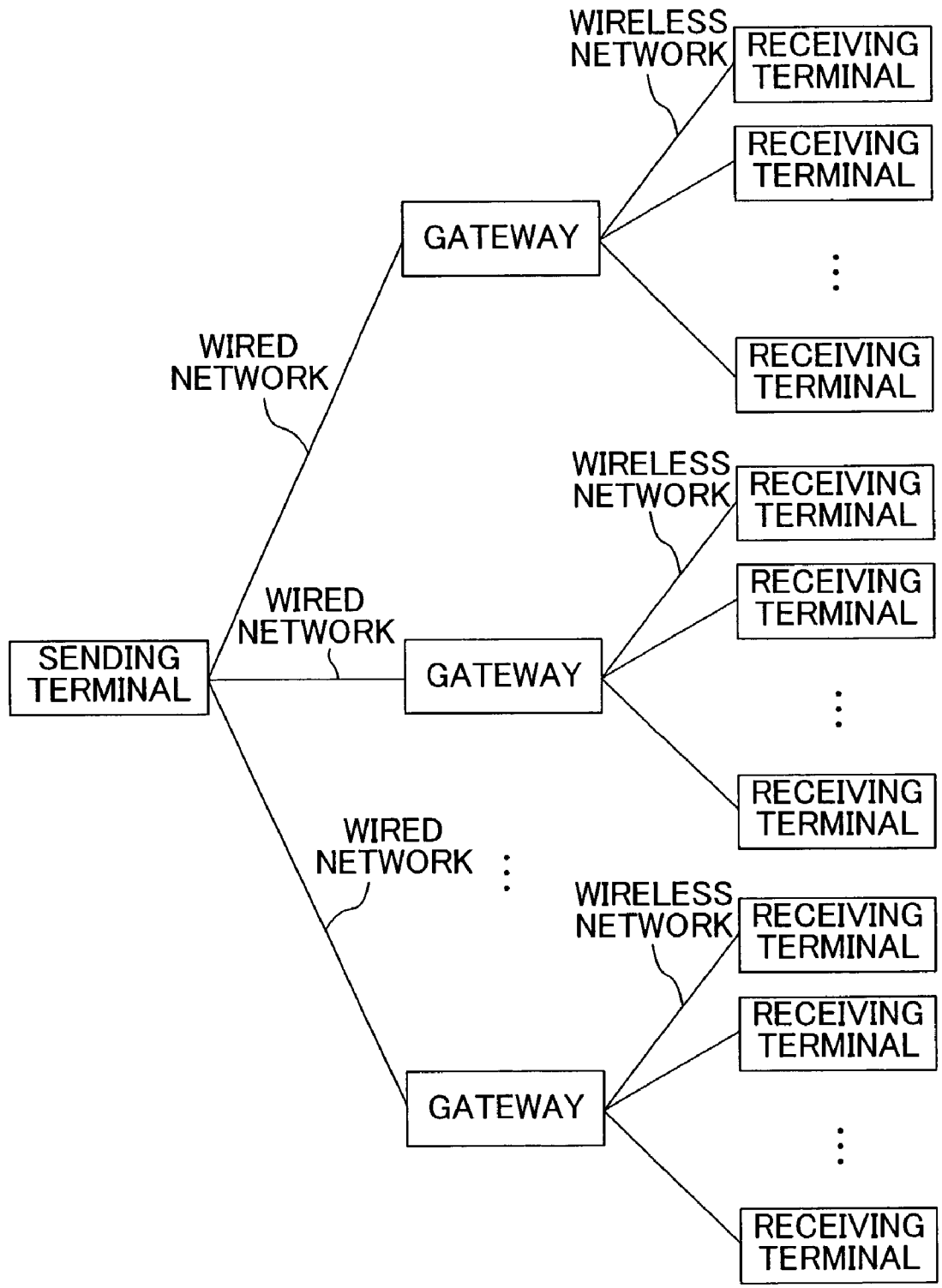
FIG. 18 is a diagram representing the connection scheme in multicast according to the seventh embodiment of the present invention.

The present invention can be applied not only to one-to-one communication but also to one-to-N communication (multicast) environments, as shown in FIG. 18. The following illustrates an embodiment of the present invention in a multicast environment.

Figure 19:
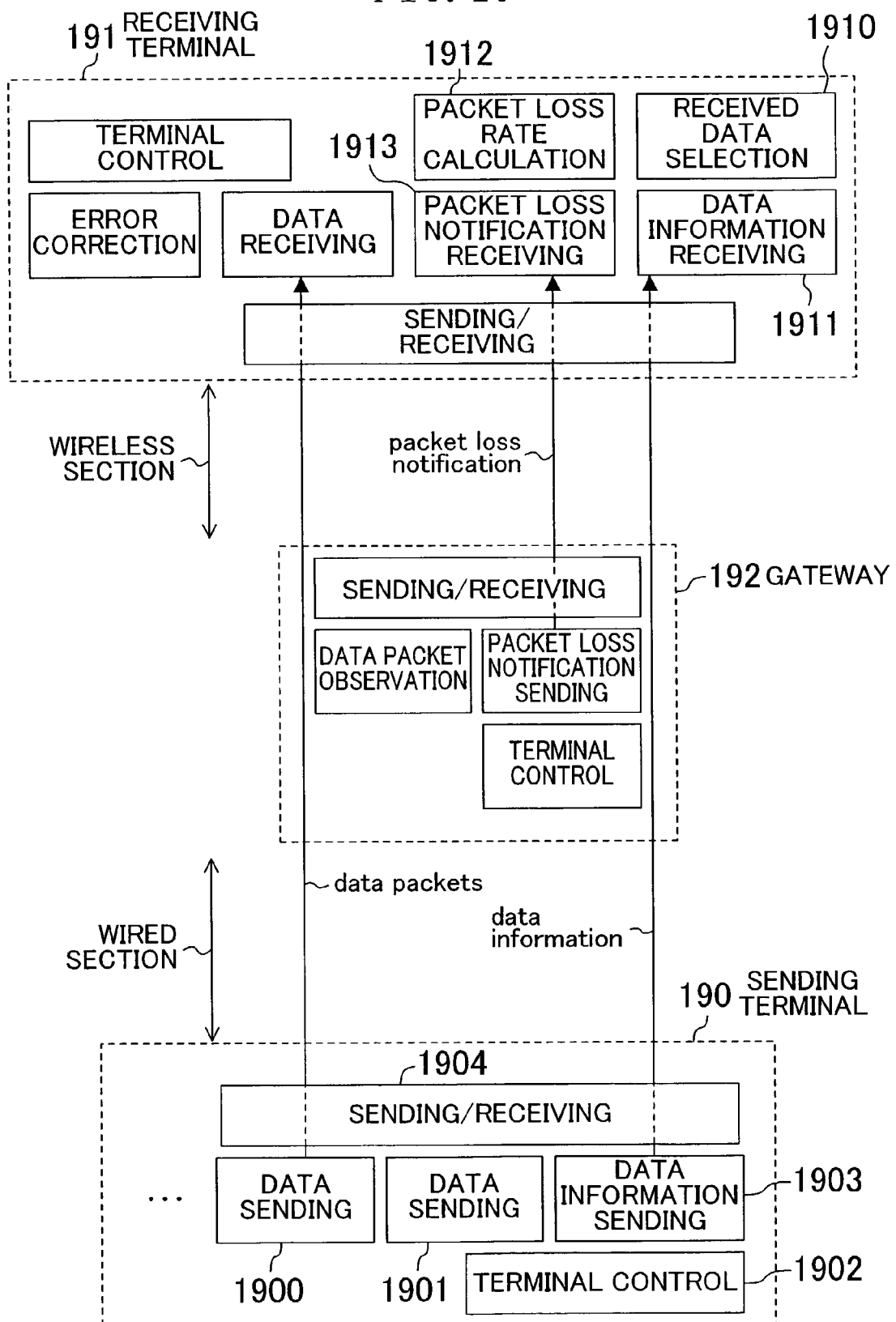
FIG. 19 is a schematic diagram illustrating an overall view of the seventh embodiment of the present invention.
Figures 20, 22, 25:
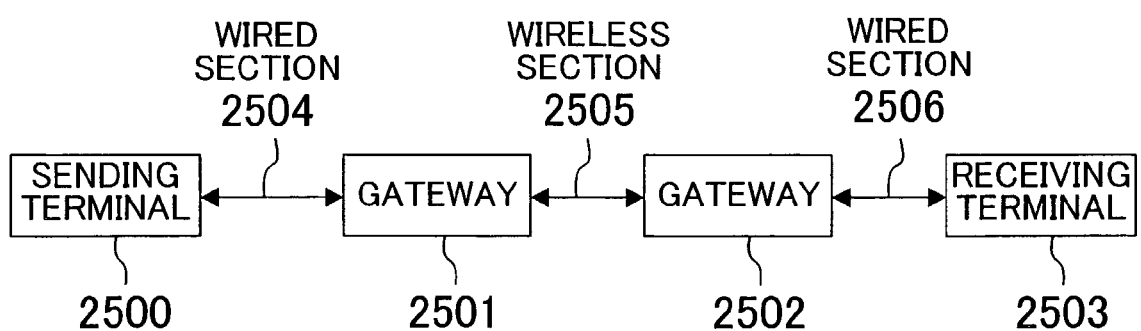
FIG. 20 is a diagram showing the correlation between the packets loss rates of the wired section and the wireless section and the multicast group to be joined according to the seventh embodiment of the present invention.
FIG. 22 is another diagram showing the correlation between the packets loss rates of the wired section and the wireless section and the multicast group to be joined according to the seventh embodiment of the present invention.
FIG. 25 is a diagram showing another connection scheme between the sending terminal and the receiving terminal in which the present invention can be suitably applied.

FIG. 19 is a schematic drawing illustrating an overall view of an embodiment using multicasting. In a sending terminal 190, a data information sending portion 1903 is a means for sending data information including the transmission rate and robustness that can be sent by the sending terminal 190. A correlation chart can be sent as this data information in which the multicast addresses and the threshold values of the packet loss rates are correlated, as shown in FIG. 20. This chart means, for example, that if the packet loss rate of the wireless section is at least 0.1 and less than 0.2, and the packet loss rate of the wired section is 0.2 or more, then the multicast address represented by the address "12" is selected and used for participating in the multicast group.

Data sending portions 1900 and 1901 are means for taking in data from inputs such as a video capture, a microphone, a file, or a shared memory, if necessary encoding the data, if necessary packetizing the data, and sending data packets through a sending/receiving portion 1904 to a receiving terminal 191. The data sending portions 1900 and 1901 are for sending data to which mutually different transmission rates or robustness have been applied. The sending terminal 190 has as many of these data sending portions as the number of multicast addresses listed in the correlation chart shown in FIG. 20. The sending/receiving portion 1904 is equivalent to the sending/receiving portion 101 in FIG. 1. A terminal control portion 1902 is a means for the integrated control of these various portions.

A gateway 192 is equivalent to the gateway 122 in FIG. 10.

The receiving terminal 191 is the receiving terminal 121 of FIG. 10 in which the control information sending means 1013 is removed and a received data selection portion 1910 and a data information receiving portion 1911 have been added.

The data information receiving portion 1911 is a means for receiving the data information with the sendable transmission rate and the robustness included by the sending terminal 190, which is sent from the sending terminal 190.

The received data selection portion 1910 selects the multicast address for the multicast group to which the receiving terminal 191 belongs, based on the packet loss rates of the wired and wireless sections as calculated by a packet loss rate calculation portion 1912 and the correlation chart obtained by the data information receiving portion 1911. It is also a means for changing the multicast group to which the receiving terminal 191 belongs to the selected multicast group. The numeral 1913 denotes the packet loss notification receiving portion provided in the receiving terminal 191.

Figure 21:
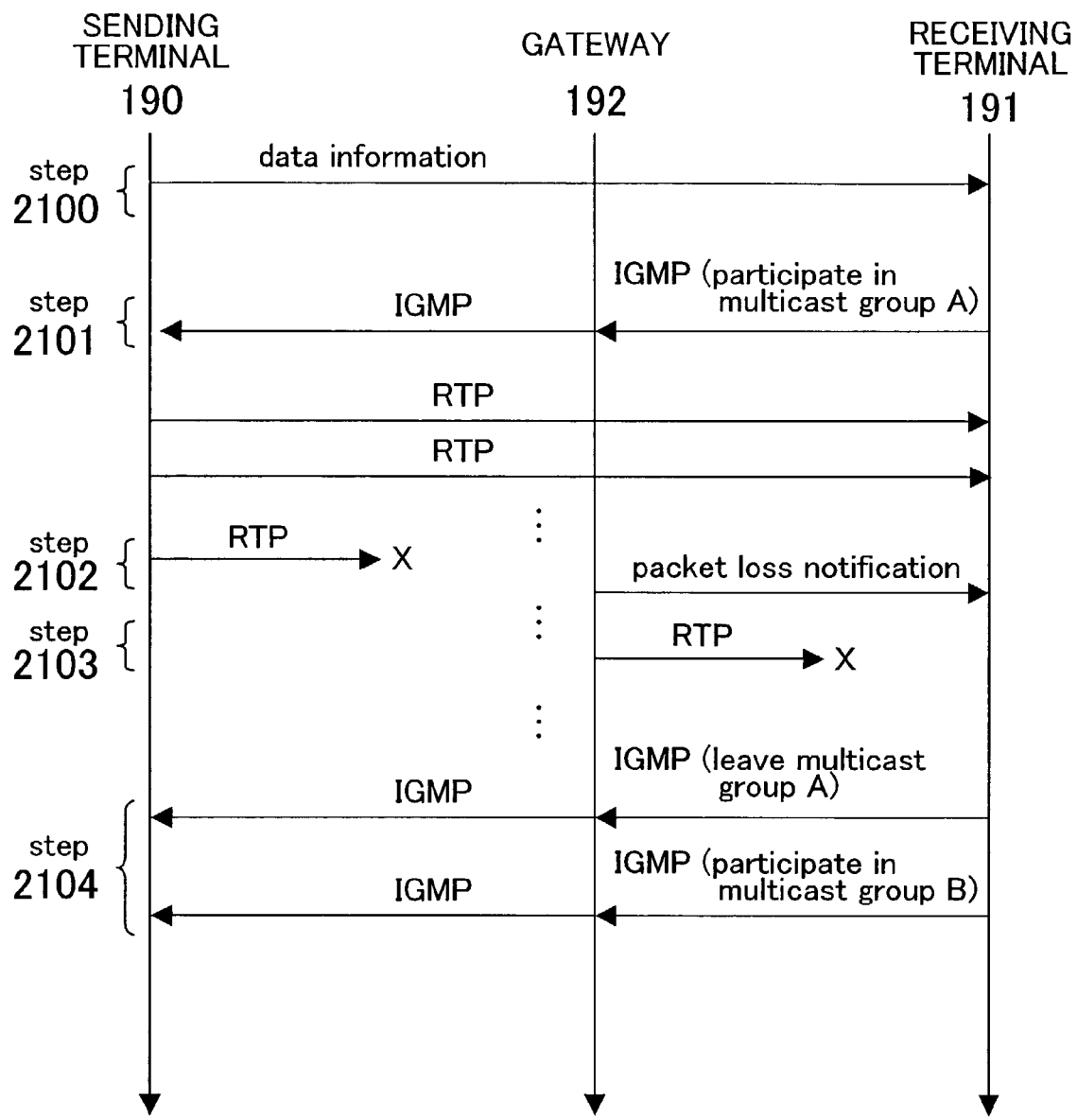
FIG. 21 is a sequence diagram between the sending terminal and the receiving terminal according to the seventh embodiment of the present invention.

FIG. 21 is a flowchart illustrating the operation of the present embodiment. First, the receiving terminal 191 obtains data information from the sending terminal 190 (step 2100). Then, it selects an appropriate multicast address from that obtained data information, and using that multicast address participates in a multicast group (step 2101). At this time an IGMP (Internet Group Management Protocol) is used. Next, the receiving terminal 191 begins to receive data packets in the multicast group which it has joined. During the transmission of data, when packet loss occurs in the wired section, a packet loss notification is sent from the gateway 192 to the receiving terminal 191 (step 2102), and when packet loss occurs in the wireless section, no packet loss notification is sent (step 2103). The receiving terminal 191 calculates the packet loss rate in the wired and wireless sections from the packet loss observed by the receiving terminal 191 and the packet loss information reported by the packet loss notification, and from these values the multicast group to which the receiving terminal 191 belongs is decided. If the decided multicast group is different from the currently joined multicast group, then the receiving terminal 191 leaves the currently joined multicast group and is placed with the new multicast address (step 2104).

It should be noted that in the above embodiment in multicasting, independent data are sent for each multicast address, however it is also possible to use a hierarchical encoding and prepare a base layer, an enhancement layer, and a robust layer (FEC layer) with the sending terminal 190, and the receiving terminal 191 can perform reception by combining these layers in accordance with the packet loss rates of the wired section and the wireless section. For example, the chart of FIG. 22 is sent to the receiving terminal 191 as the data information. Shown here is a multicast address in which B is the base layer, E1 and E2 are enhancement layers, and F1 and F2 are robust layers. Then, for example if the packet loss rate of the wireless section observed by the receiving terminal 191 is at least 0.1 but less than 0.2, and the packet loss rate of the wired section is below 0.05, then the base layer, the enhancement layer 1, and the FEC layer 1 are selected, and these layers are received.

EIGHTH EMBODIMENT

FIG. 23 is a schematic diagram illustrating an overall view of another embodiment in multicasting. FIG. 23 is a diagram in which in FIG. 19 the packet loss notification receiving portion 1913 and the packet loss rate calculation portion 1912 have been removed from the receiving terminal 191 and added to the sending terminal 190. Furthermore, the data information sending portion 1903 and the data information receiving portion 1911 are removed and a control information receiving portion 2300 and a group determining portion 2301 have been added to a sending terminal 230 and a control information sending portion 2310 and a group changing portion 2311 have been added to a receiving terminal 231.

The control information sending portion 2310 is a means for entering the packet loss rate observed by the receiving terminal 231 into the control information packets and sending those packets to the sending terminal 230. It is assumed that the protocol being used is RTCP.

In the sending terminal 230, the control information receiving portion 2300 is a means for obtaining the packet loss rate from the control information packets sent from the receiving terminal 231.

The group determining portion 2301 determines the multicast group to which the receiving terminal 231 belongs based on the packet loss rates of the wired and wireless sections calculated by a packet loss rate calculation portion 2302. It is also a means for sending multicast group notification packets, which report the multicast group to which the receiving terminal 231 belongs to the receiving terminal 231. As a method for determining the multicast group from the packet loss rates, it is possible to take the aforementioned correlation chart shown in FIG. 20 and determine the multicast group with reference to this correlation chart.

The group changing portion 2311 of the receiving terminal 231 is a means for receiving the multicast group notification packets sent from the sending terminal 230 and changing the multicast group to which the receiving terminal 231 belongs when the multicast group that is reported is different from the multicast group to which the receiving terminal 231 currently belongs.

Figure 24:
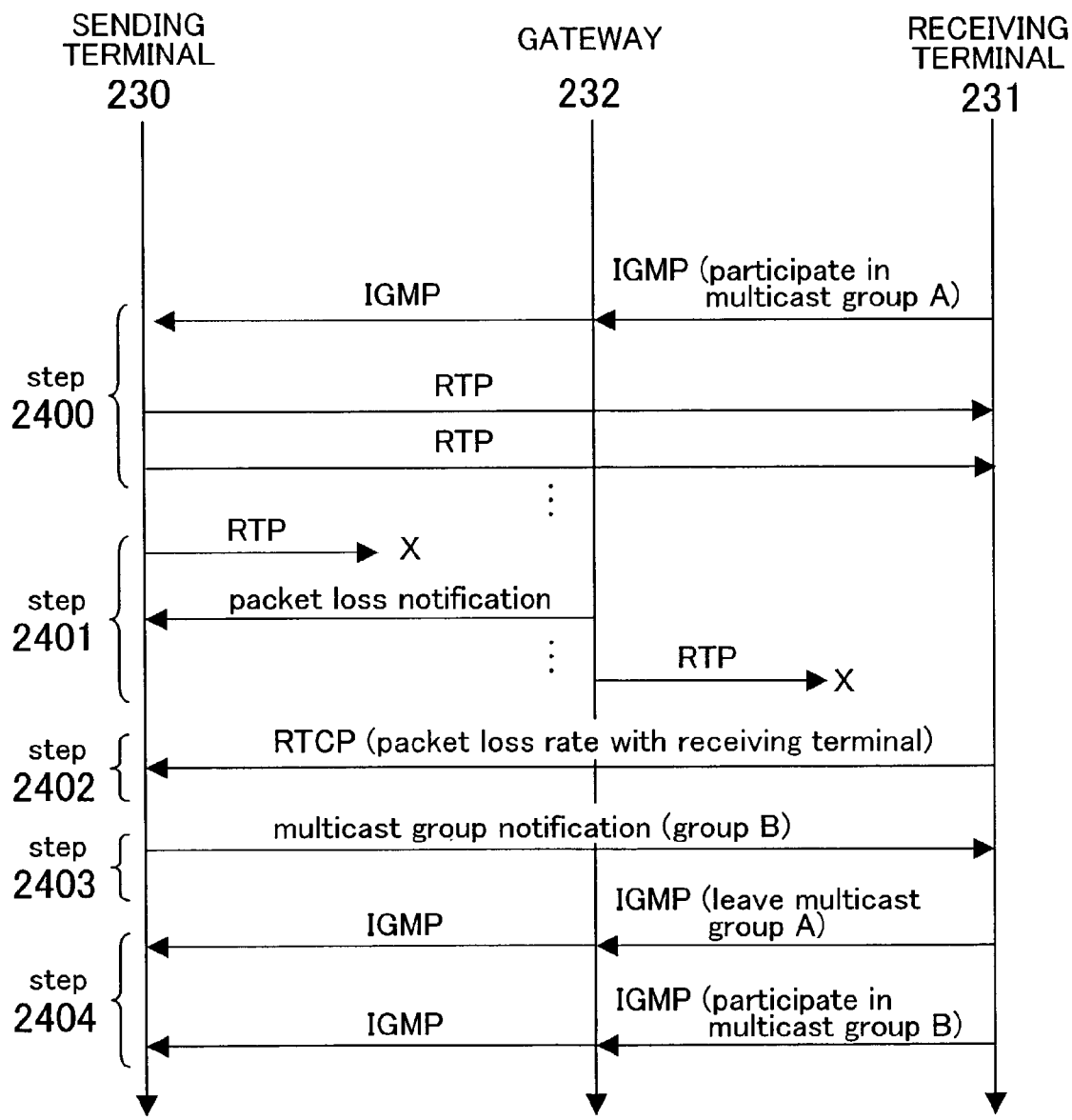
FIG. 24 is a sequence diagram between the sending terminal and the receiving terminal according to the eighth embodiment of the present invention.

FIG. 24 is a sequence diagram illustrating the operation of the configuration shown in FIG. 23. The receiving terminal 231 initially participates in a multicast group A and begins receiving data (step 2400). While receiving the data, when packet loss occurs in the wired section, a packet loss notification is sent from a gateway 232 to the sending terminal 230, and when packet loss occurs in the wireless section, no packet loss notification is sent (step 2401). The receiving terminal 231 calculates the packet loss rate from the packet loss observed by the receiving terminal 231, and sends it to the sending terminal 230 using RTCP (step 2402). The sending terminal 230 calculates the packet loss rates of the wired section and the wireless section from the packet loss notification and the packet loss rate from the receiving terminal 231, and from those values determines the multicast group to which the receiving terminal 231 should belong and notifies the receiving terminal 231 (step 2403). In the example of FIG. 24, the notification is that it should belong to the multicast group B. If the receiving terminal 231 belongs to a different multicast group than the multicast group of the notification, then the receiving terminal 231 leaves the currently joined multicast group and joins the multicast group of the notification (step 2404). Thus, the receiving terminal 231 is capable of data reception which matches the reception conditions.

The first through eighth embodiments according to the present invention are as explained above. In the above embodiments, a transmission path in which the sending terminal is in the wired section and the receiving terminal is in the wireless section is presumed, however, the present invention can also be applied to a case wherein the sending terminal is in the wireless section and the receiving terminal is in the wired section.

Furthermore, in the above embodiments, it is presumed that one wired section and one wireless section are connected in the transmission path. However, it is also possible to apply the present invention to a transmission path when a plurality of wired sections and wireless sections are connected in cascade, as shown in FIG. 25, for example. The connection scheme shown in FIG. 25 can be for example a scheme wherein an indoor network constructed as wired is connected to an outside network by FWA (Fixed Wireless Access). Also, a similar connection scheme is used when the interior network of an automobile is constructed as wired and connected to an outside network by DSRC (Dedicated Short Range Communication), for example. Conceivable applications include video distribution such as VoD and two-way communications such as TV telephone.

In the case of a connection scheme as in FIG. 25, a gateway 2501 detects packet loss which occurs between a sending terminal 2500 and the gateway 2501, and sends a packet loss notification to a receiving terminal 2503 (or the sending terminal 2500). Also, a gateway 2502 detects packet loss which occurs between the sending terminal 2500 and the gateway 2502, and notifies the receiving terminal 2503 (or the sending terminal 2500). In the receiving terminal 2503 (or the sending terminal 2500) which has received this notification, it is possible to calculate (packet loss rate of wired section 2504)=(packet loss rate calculated from the packet loss notification from the gateway 2501);

(packet loss rate of wireless section 2505)=(packet loss rate calculated from the packet loss notification from the gateway 2502)−(packet loss rate calculated from the packet loss notification from the gateway 2501);

(packet loss rate of a wired section 2506)=(packet loss rate in the receiving terminal 2503)−(packet loss rate calculated from the packet loss notification from the gateway 2502); and (total packet loss rate of the wired sections)=(packet loss rate of the wired section 2504)+(packet loss rate of the wired section 2506).

The receiving terminal 2503 (or the sending terminal 2500) is thus capable of calculating the packet loss rate of the wireless section and the packet loss rate of the wired section. Thus, by sending a packet loss notification from gateways connecting wireless sections and wired sections, the packet loss rates of the wired and wireless sections can be calculated separately, and thus it is clear that the present invention can be applied also to cases in which a plurality of wired sections and/or wireless sections are connected to one another.

The first through eighth embodiments according to the present invention and modified examples thereof are as described above, and it goes without saying that a sender device (sending terminal), a receiver device (receiving terminal), a gateway, and a send/receive system incorporating these for achieving the sending/receiving method according to the present invention are also encompassed by the present invention.

The present invention also may be a program for executing with a computer the functions of some or all of the means (or devices, elements, circuits, parts, etc.) of the above-mentioned sender device, the receiver device, the gateway and the send/receive system according to the present invention, and which operates in cooperation with a computer. It should be noted that a computer according to the present invention is not limited to pure hardware such as a CPU, and can also include firmware or an OS (operating system), as well as peripheral devices.

The present invention may be a program for executing with a computer the operations of some or all of the steps (or processes, operations, actions, etc.) of the sending/receiving method according to the present invention, which operates in cooperation with a computer.

Furthermore, a computer-readable storage medium onto which the program of the present invention is stored is also encompassed by the present invention. Also, one mode for the use of the program according to the present invention is to store it on a computer-readable storage medium and to operate it in cooperation with the computer to operate. A further mode for the use of the program according to the present invention is to transmit it through a transmission medium, read it with by a computer and then operate it in cooperation with the computer. Furthermore, examples of the storage medium include ROM (Read Only Memory), and examples of the transmission medium include transmission media such as the Internet, as well as light, electromagnetic waves, and acoustic waves.

The configuration of the present invention can be achieved by software or hardware.

INDUSTRIAL APPLICABILITY

With the present invention, it is possible to perform an efficient transmission of data with a stable transmission quality over a transmission path like the Internet in which there are various connection modes and fluctuations in the transmission bandwidth. In particular, by applying the present invention to connection modes with mixed wired networks and wireless networks, in which it has conventionally been difficult to perform data transmission with a stable transmission quality, it becomes possible to perform an efficient transmission of data with a stable transmission quality in a wide array of applications, such as Internet TV telephone, VoD, broadcasts (multicasts), and video billboards.

The invention claimed is:

1. A sending/receiving method for sending and receiving data packets between a sending terminal and a receiving terminal via a gateway in a transmission path having a wired section and a wireless section, wherein the gateway is at a boundary portion between those sections, the sending/receiving method comprising:
   notifying by the receiving terminal the gateway with control information regarding packet loss detected by the receiving terminal;
   calculating by the gateway a packet loss rate in the wired section based on the control information notified from the receiving terminal and packet loss detected by the gateway;
   calculating by the gateway a packet loss rate in the wireless section based on the control information notified from the receiving terminal and the packet loss detected by the gateway;
   notifying by the gateway the sending terminal of the calculated packet loss rates; and
   determining by the sending terminal at least one of a transmission rate or a robustness of the data packets based on the notified packet loss rates.

2. A sending/receiving method for sending and receiving data packets between a sending terminal and a receiving terminal via a gateway in a transmission path having a wired section and a wireless section,
   wherein the gateway is at a boundary portion between those sections, the sending/receiving method comprising:
   calculating a packet loss rate in the wired section and a packet loss rate in the wireless section based on packet loss detected by the gateway and packet loss detected by the receiving terminal; and
   determining at least one of a transmission rate or a robustness of the data packets based on those two packet loss rates, wherein
   the gateway sends information indicating a loss of data packets between the sending terminal and the gateway to the receiving terminal as a loss notification packet;
   the receiving terminal calculates the packet loss rate in the wired section based on the loss notification packet and the packet loss detected by the receiving terminal, and calculates the packet loss rate in the wireless section based on the loss notification packet and the packet loss detected by the receiving terminal;
   the receiving terminal notifies the sending terminal of the calculated packet loss rates; and
   the sending terminal determines at least one of a transmission rate or a robustness of the data packets based on the notified packet loss rates.

3. A sending/receiving method for sending and receiving data packets between a sending terminal and a receiving terminal via a gateway in a transmission path having a wired section and a wireless section,
   wherein the gateway is at a boundary portion between those sections, the sending/receiving method comprising:
   calculating a packet loss rate in the wired section and a packet loss rate in the wireless section based on packet loss detected by the gateway and packet loss detected by the receiving terminal; and
   determining at least one of a transmission rate or a robustness of the data packets based on those two packet loss rates, wherein
   the gateway sends information indicating a loss of data packets between the sending terminal and the gateway to the sending terminal as a loss notification packet;
   the receiving terminal notifies the sending terminal with control information regarding the packet loss detected by the receiving terminal;
   the sending terminal calculates the packet loss rate in the wired section based on the loss notification packet and the control information notified from the receiving terminal, and calculates the packet loss rate in the wireless section based on the loss notification packet and the control information notified from the receiving terminal; and
   the sending terminal determines at least one of a transmission rate or a robustness of the data packets based on the calculated packet loss rates.

4. The sending/receiving method according to claim 2 or claim 3, wherein the loss notification packet is sent in place of a data packet lost in the wired section.

5. The sending/receiving method according to claim 2 or claim 3, wherein the loss notification packet is sent using a control information channel for sending data packets.

6. The sending/receiving method according to claim 5, wherein an RTCP (RTP Control Protocol) is used for the control information channel.

7. A sending/receiving method comprising:
   based on at least one of a state of a load on a sending terminal or a transmission path, a level of service provided to a receiving terminal, a classification of an application, and a classification of data to be transmitted:
   sending from the sending terminal a retransmission request forbidding notification packet forbidding a request for retransmission to forbid a retransmission request from the receiving terminal;
   sending from the sending terminal a retransmission request allowing notification packet allowing a request for retransmission to allow a retransmission request from the receiving terminal;
   forbidding a request for retransmission when a load on the sending terminal or the transmission path is great, when the user has joined a service in which retransmission is not performed, when an application having strong real-time properties is being used, and when data to be transmitted has been assigned a lower priority by the user based on the user's preferences; and
   allowing a request for retransmission when a load on the sending terminal or the transmission path is small, when the user has joined a service in which retransmission is performed, when an application having weak real-time properties is being used, and when data to be transmitted has been assigned a higher priority by the user based on the user's preferences.

8. A sending/receiving method for sending identical data packets from a sending terminal to a plurality of receiving terminals, comprising:
   randomizing a time for performing a retransmission request from the receiving terminal or whether to perform the retransmission request; and
   sending by the sending terminal data packets for which there was a retransmission request even to receiving terminals not requesting retransmission.

9. A receiver device for receiving data packets from a sender device via a gateway in a transmission path having a wired section and a wireless section, wherein the gateway is at a boundary portion of those sections, the receiver device comprising:

a data reception means for receiving data packets from the sender device via the gateway, detecting packet loss in those data packets, and storing that packet loss number;

a packet loss notification reception means for receiving a loss notification packet from the gateway and storing the number of packet losses occurring between the sender device and the gateway;

a packet loss rate calculation means for calculating a packet loss rate in the wired section and a packet loss rate in the wireless section based on the packet loss number stored in the data reception means and the number of packet losses stored in the packet loss notification reception means; and a control information sending means for notifying the sender device of those two calculated packet loss rates.

10. A sender device for sending data packets to a receiver device via a gateway in a transmission path having a wired section and a wireless section, wherein the gateway is at a boundary portion between those two sections, the sender device comprising:

a control information reception means for receiving, from the receiver device, control information showing a packet loss rate in the wired section and a packet loss rate in a wireless section;

a robustness determining means for determining a robustness to be added to data packets based on the packet loss rate in the wireless section;

a transmission rate determining means for determining the transmission rate of data packets based on the packet loss rate in the wired section; and an operable connection to said gateway, wherein said gateway is operably connected not to request retransmission from the sender device.

11. A sender device for sending data packets to a receiver device via a gateway in a transmission path having a wired section and a wireless section, wherein the gateway is at a boundary portion between those two sections, the sender device comprising:

a control information reception means for receiving, from the receiver device, control information regarding packet loss detected in the receiver device;

a packet loss notification reception means for receiving a loss notification packet from the gateway and storing the number of packet losses occurring between the sender device and the gateway;

a packet loss rate calculation means for calculating a packet loss rate in the wired section and a packet loss rate in the wireless section based on the control information received by the control information reception means and the number of packet losses stored in the packet loss notification reception means;

a robustness determining means for determining a robustness to be added to data packets based on the packet loss rate in the wireless section; and a transmission rate determining means for determining the transmission rate of data packets based on the packet loss rate in the wired section.

12. A program stored in a computer readable medium for a receiving terminal which receives data packets from a sending terminal via a gateway in a transmission path having a wired section and a wireless section, wherein the gateway is at a boundary portion between the two sections, the program comprising:

a step for receiving data packets from the sending terminal via the gateway, detecting packet loss in those data packets, and storing the number of lost packets;

a step for receiving a loss notification packet from the gateway and storing the number of lost packets occurring between the sending terminal and the gateway;

a step for calculating a packet loss rate in the wired section and a packet loss rate in the wireless section based on the number of lost packets stored in the data reception means and the number of lost packets stored in the packet loss notification reception means; and a step for notifying the sending terminal of the two calculated packet loss rates.

\* \* \* \* \*